United States Patent
Schulz

(10) Patent No.: US 9,521,125 B2
(45) Date of Patent: Dec. 13, 2016

(54) PSEUDONYMOUS REMOTE ATTESTATION UTILIZING A CHAIN-OF-TRUST

(71) Applicant: Intel Corporation, Santa Clara, CA (US)

(72) Inventor: Steffen Schulz, Darmstadt (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/693,174

(22) Filed: Apr. 22, 2015

(65) Prior Publication Data

US 2015/0264021 A1     Sep. 17, 2015

Related U.S. Application Data

(63) Continuation-in-part of application No. 14/209,129, filed on Mar. 13, 2014.

(51) Int. Cl.
*H04L 29/06* (2006.01)

(52) U.S. Cl.
CPC ....... *H04L 63/0435* (2013.01); *H04L 63/0414* (2013.01); *H04L 63/061* (2013.01); *H04L 63/0876* (2013.01)

(58) Field of Classification Search
CPC ............. H04L 63/0414; H04L 63/0435; H04L 63/061; H04L 63/0876
See application file for complete search history.

(56) References Cited

U.S. PATENT DOCUMENTS

| | | |
|---|---|---|
| 7,266,198 B2 | 9/2007 | Medvinsky |
| 7,974,416 B2 | 7/2011 | Zimmer et al. |
| 8,060,934 B2 | 11/2011 | Cabuk et al. |
| 2005/0132357 A1 | 6/2005 | Shell et al. |
| 2005/0141717 A1 | 6/2005 | Cromer et al. |

(Continued)

FOREIGN PATENT DOCUMENTS

WO     2013028059 A1     2/2013

OTHER PUBLICATIONS

Yang et al., (Provable Data Possession of Resource-constrained Mobile Devices in Cloud Computing, Journal of Networks, vol. 6, No. 7, Jul. 2011, pp. 1033-1040).*

(Continued)

*Primary Examiner* — Oleg Korsak
(74) *Attorney, Agent, or Firm* — Grossman, Tucker, Perreault & Pfleger, PLLC

(57) ABSTRACT

The present application is directed to pseudonymous attestation utilizing a chain of trust. An example prover device may include a chain-of-trust based on keys derived cryptographically from a shared symmetric key and pseudonymous identification data. The chain-of-trust may be used to cryptographically generate a pseudonymous public key and private key. The prover device may provide at least pseudonymous identification data and the pseudonymous public key to a verifier device. The verifier device may access pseudonymous data published by a certifier determine whether the prover device is authentic and includes known-good versions of software (e.g., sourced from the certifier). In this manner, the verifier device may be assured that the prover device is authentic without knowing the actual identity of the prover device. In at least one embodiment, the prover device may also include a trusted execution environment (TEE).

25 Claims, 10 Drawing Sheets

(56) References Cited

U.S. PATENT DOCUMENTS

| | | | |
|---|---|---|---|
| 2008/0244292 A1 | 10/2008 | Kumar et al. |
| 2009/0049510 A1 | 2/2009 | Zhang et al. |
| 2009/0300348 A1 | 12/2009 | Aciicmez et al. |
| 2010/0082960 A1 | 4/2010 | Grobman et al. |
| 2010/0332841 A1 | 12/2010 | Watts et al. |
| 2011/0099605 A1 | 4/2011 | Cha et al. |
| 2012/0072979 A1 | 3/2012 | Cha et al. |
| 2013/0179693 A1 | 7/2013 | Smith et al. |
| 2014/0026200 A1 | 1/2014 | Ekberg et al. |
| 2014/0282935 A1 | 9/2014 | Lal et al. |
| 2015/0032996 A1 | 1/2015 | Koeberl et al. |

OTHER PUBLICATIONS

Toegl, et al., ("An approach to introducing locality in remote attestation using near field communications", The Journal of Supercomputing, vol. 55, Issue 2, Feb. 2011, pp. 207-227).*

Office Action received for U.S. Appl. No. 14/209,129, mailed on May 21, 2015, 26 pages.

Azema, et al., "M-Shield Mobile Security Technology: making wireless secure," Texas Instruments, Feb. 2008, White Paper, 6 pages.

Office Action for related U.S. Appl. No. 14/543,097 mailed on Aug. 28, 2015.

Defrawy et al., "SMART: Secure and Minimal Architecture for (Establishing a Dynamic) Root of Trust", Feb. 8, 2012, 15 pages.

Perrig et al., "The TESLA Broadcast Authentication Protocol", 2002, pp. 2-13.

Seshadri et al., "SAKE: Software Attestation for Key Establishment in Sensor Networks", 2008, 14 pages.

Seshadri et al., "SWATT: SoftWare-based ATTestation for Embedded Devices", May 9-12, 2004, 11 pages.

Strackx et al., "Efficient Isolation of Trusted Subsystems in Embedded Systems", 2010, 18 pages.

Szydlo, Michael, "Recent improvements in the efficient use of Merkle Trees: Additional Options for the Long Term", RSA Laboratories, Mar. 10, 2004, 2 pages.

International Search Report and Written Opinion received for PCT Application No. PCT/US2015/019216, mailed on May 28, 2015, 11 pages.

GitHub, iSECPartners/nano-ecc, hppts://github.com/iSECPartners/nano-ecc, 2 pages.

Barker, et al., "Recommendation for Pair-Wise Key Establishment Schemes Using Discrete Logarithm Cryptography," National Institute of Standards and Technology, U.S. Department of Commerce, NIST Special Publication 800-56A, Revision 2, http://dx.doi.org/10.6028/NIST.SP.800-56Ar2, 138 pages.

Reyzin, et al., "Better than BiBa: Short One-time Signatures with Fast Signing and Verifying," http://www.cs.bu.edu/~reyzin, Apr. 30, 2002 (Algorithm on p. 4 clarified Oct. 17, 2007), 9 pages.

Taiwan Office Action from related application 104103470 dated Dec. 9, 2015.

Final Office Action for related U.S. Appl. No. 14/209,129, mailed on Sep. 25, 2015.

Toegl, et al., "An approach to introducing locality in remote attestation using near field communications", J Supercompute, Mar. 19, 2010.

Office Action for related U.S. Appl. No. 14/543,097, mailed Aug. 28, 2015.

St. Clair et al., "Establishing and Sustaining System Integrity via Root of Trust Installation", IEEE, 2007.

Parno et al., "Bootstrapping Trust in Commodity Computers", IEEE 2010.

Tan et al., "Secure Multihop Network Programming with Multiple One-Way Key Chains", IEEE 2011.

Eisenbarth et al., "Reconfigurable Trusted Computing in Hardware", STC'07, Nov. 2, 2007.

Office Action for related U.S. Appl. No. 14/209,129, mailed Feb. 26, 2016, 21 pages.

International Search Report and Written Opinion for PCT Application No. PCT/US2015/060979, mailed Mar. 31, 2016, 11 pages.

International Preliminary Report on Patentability from related application PCT/US2015/019216 issued Sep. 13, 2016.

* cited by examiner

PSEUDONYMOUS REMOTE ATTESTATION UTILIZING A CHAIN-OF-TRUST

PRIORITY

The present application is a Continuation-in-Part (CIP) of co-pending application Ser. No. 14/209,129 entitled "Symmetric Keying and Chain of Trust" that was filed on Mar. 13, 2014. The content of the above-identified application is incorporated herein, in entirety, by reference.

TECHNICAL FIELD

The present disclosure relates to device security, and more particularly, to system that may allow a device to prove identity and data authenticity without disclosing its actual identity.

BACKGROUND

Preventing various devices from being compromised by malicious software or "malware" is becoming increasingly difficult as new strategies continue to emerge that circumvent existing security measures. For example, malware such as "rootkits" may seek to compromise security in a device by being loaded during device initialization. As a result, these rootkits may maintain a level of privilege in the device that exceeds even that of anti-virus software. Trusted Execution (TXT) is at least one security concept that may maintain security starting from initialization. In TXT a trusted platform module (TPM) may maintain "measurements" (e.g., results generated by cryptographic hash functions performed on at least part of a program's code) for known-good programs in a secure memory within the device. As programs are loaded into the device, they may be measured to determine if a known-good version of the program has been loaded. Any changes to the program would yield a different measurement, indicating that the program may have be malware or at least a version of the original program that has been altered by malware. In one embodiment, a "chain of trust" may also be instituted wherein each program measures a subsequently loaded program to ensure that all programs in the chain are known-good programs.

While effective to deter unauthorized access, TXT may require resources such as secure co-processors, secure memory, etc. to support attestation via asymmetric encryption keys. Such resources may be readily available in more robust platforms such as desktop computers, laptop computers and even mobile devices like tablet computers and smart phones. However, devices are now being developed that may not comprise these resources but may still be susceptible to being compromised by malware. For example, small format devices such as wearable devices, sensors and/or devices that may depend on energy harvesting (e.g., generating their own energy for available sources such as mechanical energy, solar energy, etc.) may comprise computing resources that may only be powerful enough to sustain the operation for which the device was designed. Without a low-level protection scheme enabling security measures such as integrity reporting (e.g., for verifying that a program is a known good version of the program) and sealing (e.g., for protecting software secrets such as encryption keys) that may be implemented via TPM, TXT, etc., it may be impossible to detect if a resource-constrained device has been compromised by malware, and consequently, to prevent the malware on the resource-constrained device from infecting other computing devices with which the resource-constrained device may interact.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
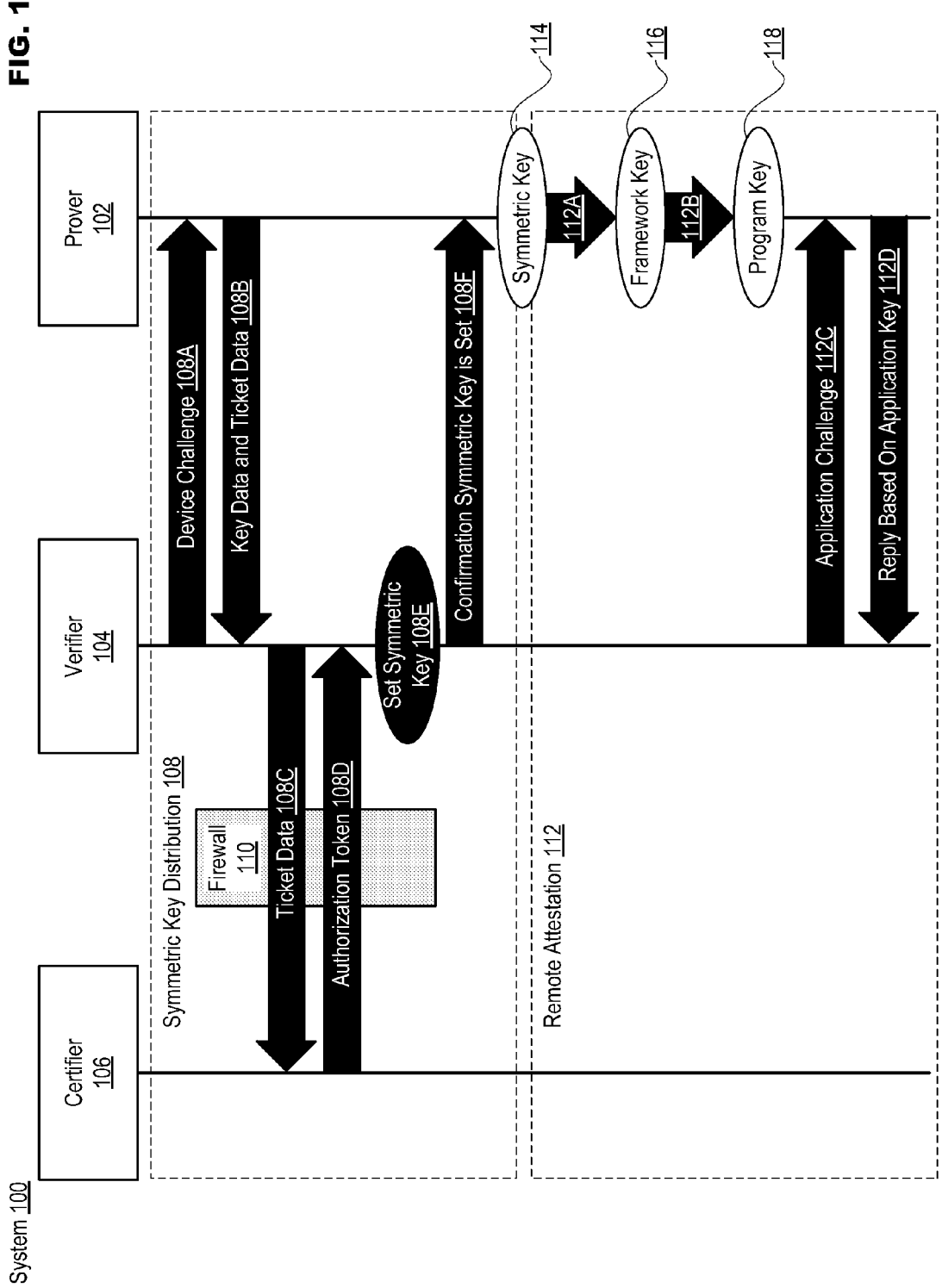
FIG. 1 illustrates an example system for symmetric keying and chain of trust in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to symmetric keying and chain of trust. In one embodiment, a prover device may communicate with a verifier device to authenticate the identity of the prover device, applications executing on the prover device or data provided by the applications executing on the prover device. Interaction between the prover device and verifier device may occur in two phases. The verifier device may initially issue a challenge to authenticate the identity of the prover device, which may then result in symmetric attestation keys being stored on the prover and verifier devices. The challenge may involve the prover device providing at least key data and ticket data to the verifier device, which may then provide at least the ticket data to a certifier (e.g., at least one device corresponding to the manufacturer, distributor, seller, etc. of the prover device). If the ticket data is recognized, the certifier may transmit an authorization token to the verifier device allowing the symmetric attestation key to be set in the verifier using the key data and then confirmed to the prover. The symmetric attestation key may be employed by the prover device in establishing a chain of trust that may be used to respond when the verifier device challenges the authenticity of applications attempting to access the verifier device, the authenticity of data provided by applications in the prover device, etc. For example, the symmetric attestation key may be used to generate a first level key, which may in turn be used to generate program keys. A challenge response may include at least program key data that may be authenticated by the verifier device with the symmetric attestation key.

In one embodiment a device that may act as a verifier may comprise, for example, a communication module and a trusted execution environment (TEE). The TEE may include at least an attestation module to detect an attestation trigger, determine whether to initiate symmetric key distribution operations or remote attestation operations with a prover device based at least on the attestation trigger and initiate at least one of symmetric key distribution operations or remote attestation operations with the prover device based on the determination.

Attestation may be triggered, for example, periodically or due to a request to access resources received from the prover device via the communication module. The communication module may be to interact with the prover device via at least one of a short-range wireless connection or a direct wired connection. The attestation module being to initiate the symmetric key distribution operations with the prover device may comprise the attestation module being to cause the communication module to transmit a device challenge to the prover device and receive a response to the device challenge from the prover device via the communication module, the response comprising at least key data and ticket data. The attestation module may then be further to cause the communication module to transmit at least the ticket data to at least one certifier device, receive a response from the at least one certifier device via the communication module and determine whether the response received from the certifier device comprises a authorization token. In one embodiment, the device may further comprise a firewall through which the communication module interacts with the at least one certifier device, the firewall being to at least prevent unintended interaction between the device and the at least one certifier device. The attestation module may be further to, if an authorization token is determined to have been received, set a symmetric key based at least on the key data and cause the communication module to transmit a confirmation that the symmetric key has been set to the prover device.

In the same or a different embodiment, the attestation module being to initiate the remote attestation operations with the prover device comprises the attestation module being to cause the communication module to transmit an application challenge to the prover device, receive a response to the application challenge from the prover device via the communication module, the response being generated based at least on counter data, code measurement data and program key data, authenticate the response and cause the communication module to transmit at least the results of the authentication to the prover device. The attestation module being to authenticate the response may comprise, for example, the attestation module being to authenticate that the response was generated based on the symmetric key using a message authentication code. An example method for remote attestation using symmetric keys consistent with the present disclosure may comprise detecting an attestation trigger, determining whether to initiate symmetric key distribution operations or remote attestation operations with a prover device based at least on the attestation trigger and initiating at least one of symmetric key distribution operations or remote attestation operations with the prover device based on the determination.

FIG. 1 illustrates an example system for symmetric keying and chain of trust in accordance with at least one embodiment of the present disclosure. System 100 may comprise, for example, prover 102, verifier 104 and certifier 106. In general, verifier 104 may cooperate with certifier 106 to authenticate prover 102, applications running on prover 102, data provided by prover 102, etc. Prover 102 may be any device capable of interacting with verifier device 104 as illustrated in FIG. 1. Advantageously but not necessarily, the operations disclosed in regard to system 100 may allow prover 102 to be a resource limited device (e.g., limited processing power, energy storage, etc.) that would not otherwise be able to support existing attestation schemes such as a worn device (e.g., smart watch, eyewear, clothing, etc.), an implantable device (e.g., a device for monitoring a particular medical condition), a device that relies on energy harvesting (e.g., electromechanical generation, solar, etc.), a sensor device, an actuator device, etc. Verifier 104 may comprise a device with more substantial computing resources that may be capable of, for example, maintaining security via protection schemes based on TXT, TDM, etc. Examples of verifier 104 may comprise, but are not limited to, a mobile communication device such as a cellular handset or a smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Certifier 106 may be an entity for certifying the identity of prover 102, and as such, may be, for example, the manufacturer of prover 102, a retailer or distributer of prover 102, etc. In one embodiment, certifier 106 may comprise at least one device accessible to verifier 104 via wired or wireless communication. For example, certifier 106 may include at least one server accessible via the Internet (e.g., organized in a cloud-computing configuration). For the sake of explanation herein, an example real-world application that may be used to envision system 100 may comprise at least one wearable sensor (e.g., prover 102) for monitoring a user's physiological performance, the wearable sensor being wirelessly coupled to a smart phone (e.g., verifier 104) in the user's pocket, the smart phone communicating with the manufacturer of the at least one wearable sensor (e.g., certifier 106) via a wireless Internet link.

A known solution for attestation may comprise embedding a certified public key into a trusted execution environment (TEE) in prover 102 that verifier 104 may use in authentication based on asymmetric keying (e.g., with assistance from certifier 106 that may interact directly with the TEE of prover 102). Given that performing elliptic curve cryptography (ECC) point multiplication can consume significant processing resources on low-end CPUs, and that existing protocols typically require more than one such operation, existing solutions may be too slow, costly, etc. for resource-constrained devices (e.g., it may take three point multiplications for establishing a session key with a Fully Hashed Menezes-Qu-Vanstone (FHMQV) protocol).

A corresponding symmetric solution (e.g., using Advanced Encryption Standard-Cypher-based Message Authentication Code (AES-CMAC)) may be many times faster, but requires a shared symmetric authentication key enabling certifier 106 to authenticate the TEE. While in both approaches certifier 106 may be trusted by all parties, allowing certifier 106 to participate in key negotiation means certifier 106 could later be used to impersonate prover 102 and spoof an attestation towards verifier 104. This vulnerability is addressed in embodiments consistent with the present disclosure wherein verifier 104 may isolate prover 102 during the key exchange to prevent interaction with certifier 106. As a result, verifier 104 and prover 102 can negotiate a key that can be authorized but not derived by certifier 106, and thus, may be secured against spoofing.

Consistent with the present disclosure, verifier 104 may initiate at least two categories of operations: symmetric key distribution 108 and remote attestation 112. For example, symmetric key distribution 108 involve interaction that results in the distribution of symmetric keys for use by prover 102 and verifier 104 during remote attestation 112. Initially, verifier 104 may issue device challenge 108A to prover 102. Device challenge 108A may be message that challenges prover 102 to "prove" its identity. Device challenge 108A may be triggered by a variety of events such as, for example, the activation of verifier 104, a periodic trigger in device 104, a request from prover 102 to access resources on verifier 104, the receipt of data provided by prover 102 at verifier 104, etc. Prover 102 may respond to verifier 104 as shown at 108B, the response including at least key data and ticket data. The key data may allow verifier 104 to confirm that response message 108B was received from prover 102 and may comprise at least a symmetric key generated by prover 102 that may be set in verifier 104 later during symmetric key distribution 108. The ticket data may be usable by an entity like certifier 106 to authenticate the identity of prover device 102. Verifier 104 may then forward at least the ticket data to certifier 106 as shown at 108C. In one embodiment, verifier 104 may be protected by firewall 110 that, for example, prevents intrusion from a local-area network (LAN), a wide-area network (WAN) like the Internet, a global-area network (GAN), etc. into the personal-area network (PAN), body-area network (BAN), etc. including at least prover 102 and verifier 104. Firewall 110 may physically or logically prevent unintended interaction between prover 102 and certifier 106 or other parties apart from verifier 104. Thus, verifier 104 may be assured that the deployed symmetric key is known only to prover 102 and verifier 104, and not to other parties outside of firewall 110. In the same or a different embodiment, the channel between verifier 104 and certifier 106 through firewall 110 may be a secure channel to ensure that the data being exchanged is not intercepted. As discussed above, the information forwarded to certifier 106 may be limited to the ticket data (e.g., only the data needed to verify the identity of prover 102) to ensure that certifier 106 does not have all of the data needed to impersonate prover 102.

Certifier 106 may utilize at least the ticket data to authenticate prover 102 (e.g., to ensure that another device is not impersonating prover 102). For example, the ticket data may comprise manufacturer data, model data, serial number, build date and/or dedicated verification data that may be used to verify that prover 102 is actually a product that was provided (e.g., manufactured, configured, distributed, sold, etc.) by certifier 106. If prover 102 is determined to be authentic, a response may be transmitted from certifier 106 to verifier 104 comprising at least authorization token as shown at 108D. Verifier 104 may use the authorization token in setting the symmetric key as shown at 108E. Setting the symmetric key may comprise, for example, designating the symmetric key for use in device/program/data authentication interactions with prover 102 and then storing the symmetric key in verifier 104 (e.g., in secure memory such as a TEE). Verifier 104 may then confirm that the symmetric key has been set to prover 102 as shown at 108F.

Remote attestation 112 may initiate in prover 102 with chain of trust derivation. For example, an initial framework key in the chain of trust may derived as shown at 112A based on symmetric key 114 that was provided to prover 102 as shown at 108E. Each subsequent key (e.g., program key 118) may be derived in part from at least the previous key (e.g., framework key 116) as shown at 112B. In this manner, various operational levels in prover 102 such as, for example, OS, applications, add-on modules, etc. may each have a key that may be authenticated using symmetric key 114. An example interaction is shown wherein application challenge 112C is transmitted by verifier 104 to prover 102. Application challenge 112C may include a message challenging an application to "prove" that the application resides on prover 102 and/or that data originated from prover 102. Similar to device challenge 108A, application challenge 112C may be triggered by an application on prover 102 requesting to access resources in verifier 104, data being provided from prover 102 to verifier 104, etc. Reply 112D may be transmitted in response to application challenge 112C, reply 112D comprising data based on at least program key 118 that may be authenticated in verifier 104 utilizing, for example, symmetric key 114.

Consistent with the present disclosure, chain of trust derivation does not require centralized recording of measurements that are trusted by all parties, and thus, devices do not require hardware-based protection to secure measurements or to report and sign them on behalf of others. Instead, software may be responsible for deriving keys correctly and Execution-Aware Memory Protection may be used to protect generated keys 116, 118, etc. from threats in the OS or other applications. Further to reduced hardware cost, chain of trust derivation may also mitigate the problem of performance bottlenecks during bootstrapping and trusted execution on resource constrained devices. The resulting attestation protocols require only a message authentication code (MAC) to prove the correct loading of a particular application, and may be easily and more efficiently integrated in secure channel protocols as compared to interoperating with central trusted subsystems (e.g., TPM). While symmetric chain of trust may be limited to provide only load-time measurement and attestation of individual (e.g., isolated) applications, it is a current trend to focus on the measurement and validation of individual isolated applications (e.g., trusted execution) due to the high complexity of verifying the complete software state of a device. Furthermore, the extension of remote attestation with runtime program measurements is currently unsolved but is now addressed in embodiments consistent with the present disclosure.

Figure 2:
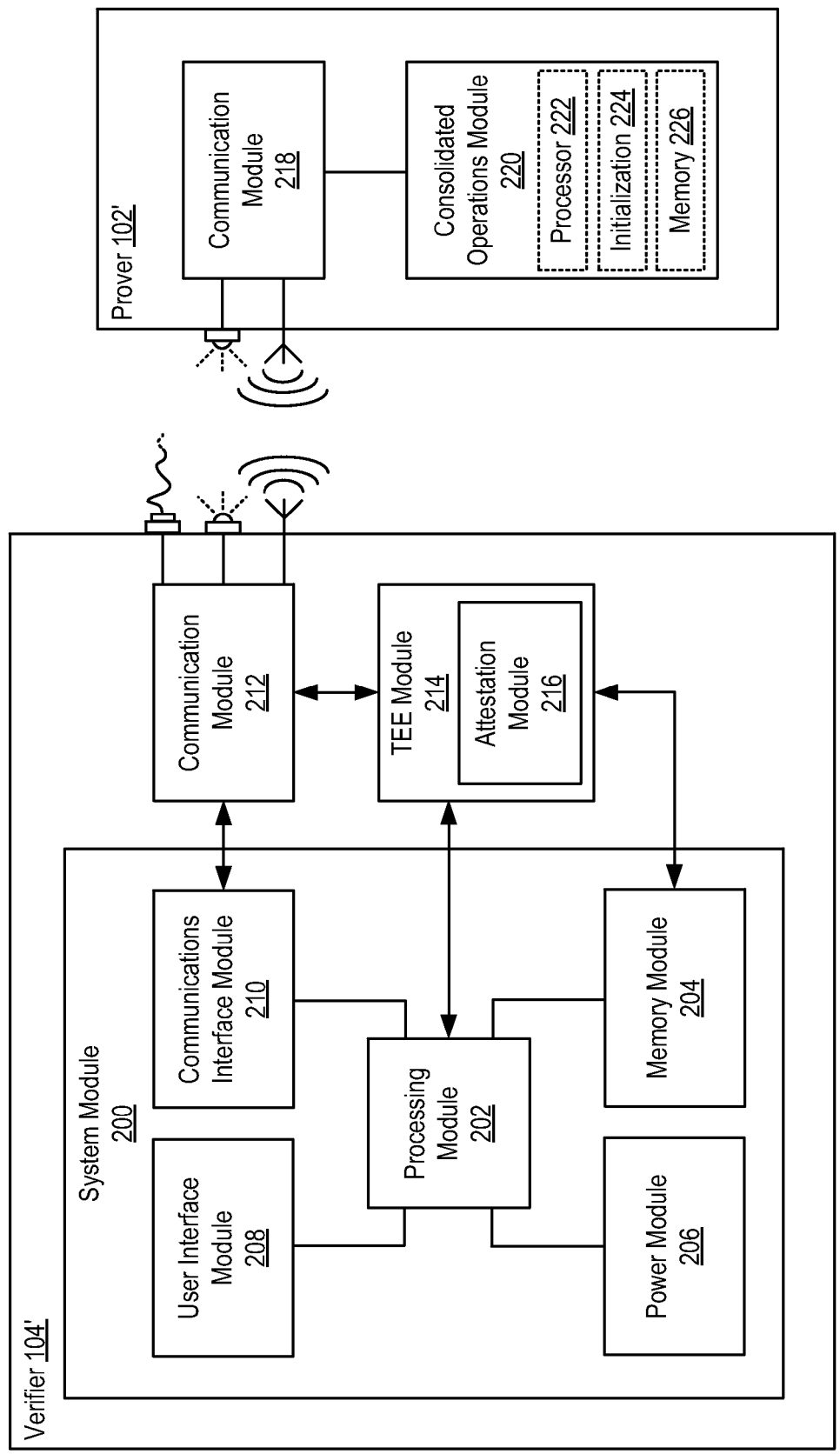
FIG. 2 illustrates example configurations for a verifier device and a prover device usable in accordance with at least one embodiment of the present disclosure.

FIG. 2 illustrates example configurations for verifier 104' and prover 102' usable in accordance with at least one embodiment of the present disclosure. In particular, verifier 104' and prover 102' may be capable of performing example functionality such as disclosed in FIG. 1. However, verifier 104' and prover 102' are meant only as examples of apparatuses that may be usable in embodiments consistent with the present disclosure, and are not meant to limit these various embodiments to any particular manner of implementation. Verifier 104' may comprise, for example, system module 200 configured to manage device operations. System module 200 may include, for example, processing module 202, memory module 204, power module 206, user interface module 208 and communication interface module 210. Verifier 104' may also include communication module 212 and TEE module 214. While communication module 212 and TEE module 214 have been illustrated as separate from system module 200, the example implementation shown in FIG. 2 has been provided merely for the sake of explanation. Some or all of the functionality associated with communication module 212 and TEE module 214 may be incorporated into system module 200.

In verifier 104', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in verifier 104'. Some or all of the functionality commonly associated with the support circuitry may also be included in the same physical package as the processor (e.g., such as in the Sandy Bridge family of processors available from the Intel Corporation).

Processing module 202 may be configured to execute various instructions in verifier 104'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of verifier 104' such as, for example, static RAM (SRAM) or Dynamic RAM (DRAM). ROM may include non-volatile (NV) memory modules configured based on BIOS, UEFI, etc. to provide instructions when verifier 104' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply verifier 104' with the power needed to operate. User interface module 208 may include hardware and/or software to allow users to interact with verifier 104' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within verifier 104' and/or may be coupled to verifier 104' via a wired or wireless communication medium.

Communication interface module 210 may be configured to manage packet routing and other control functions for communication module 212, which may include resources configured to support wired and/or wireless communications. In some instances, verifier 104' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

TEE module 214 may be a secure workspace in which known-good programs may execute, confidential information may be stored in a secure manner, etc. In general, TEE module 214 may comprise a set of computing resources that are secure such that programs executing within TEE module 214, and any data associated with the executing programs, are isolated. The programs/data cannot be interfered with or observed during program execution with the exception that the program may be started or stopped and the associated data may be inserted or deleted. The insertion of data may be unobserved, and thus not interfered with, and any data leaving TEE module 214 is released in a controlled manner. Consistent with the present disclosure, at least one known-good program executing within TEE module 214 may perform any or all operations disclosed herein in regard to TEE module 106. In one example implementation, TEE module 214 may utilize Software Guard Extensions (SGX) technology developed by the Intel Corporation. SGX may provide a secure and hardware-encrypted computation and storage area inside of the system memory, the contents of which cannot be deciphered by privileged code or even through the application of hardware probes to memory bus. When TEE module 214 is protected by SGX, embodiments consistent with the present disclosure make it impossible for an intruder to decipher the contents of TEE module 214. Protected data cannot be observed outside of SGX, and thus, is inaccessible outside of SGX.

In an example implementation wherein TEE module 214 is implemented using SGX, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE module 106. For example, known-good programs in TEE module 106 may encrypt data such as keys, passwords, licenses, etc. so that only verified good programs may decrypt this data.

Attestation module 216 may reside within TEE module 214. Attestation module 216 may interact with, for example, processing module 202, memory module 204 and communication module 212. In an example of operation, attestation module 216 may cause communication module 212 to send challenges to prover 102' and may receive attestation and ticket data from prover 102'. Attestation module 216 may utilize processing resources in processing module 202 and/or memory resources in memory module 204 to process the data received from prover 102'. Moreover, attestation module 216 may cause communication module 212 to transmit at least the ticket data to verifier 104 and may receive authorization token information from verifier 104 for use in generating symmetric keys 114. Attestation module 216 may then cause communication module 212 to transmit at least one symmetric key 114 to prover 102'.

Prover 102' has been represented as a resource-limited device in the example of FIG. 2. Communication module 218 may be configured to transmit and receive data to at least verifier 104' (e.g., communication module 212). Data received by communication module 218 may be provided to operational resources in prover 102' (e.g., to consolidated operations module 220). Consolidated operations module 220 may be able to perform functionality similar to system module 200 but on a smaller scale. For example, consolidated operations module 220 may comprise an all-in-one processing solution such as an SoC that may be configured to handle all of the processing operations for prover 102' including resources such as, for example, processor 222, platform initialization module (e.g., a boot loader) 224, memory 226, etc. In one embodiment, consolidated operations module 220 may cause communication module 218 to interact with communication module 212. In one embodiment, this interaction may be limited to wired communication, close-proximity or short-range wireless communication. While this limitation may simply be a functional reality of prover 102', it may also serve to enhance the security of the interaction between verifier 104' and prover 102' in that prover 102' may only be able to interact with a single device in close range (e.g., verifier 104') during symmetric key distribution 108.

Figure 3:
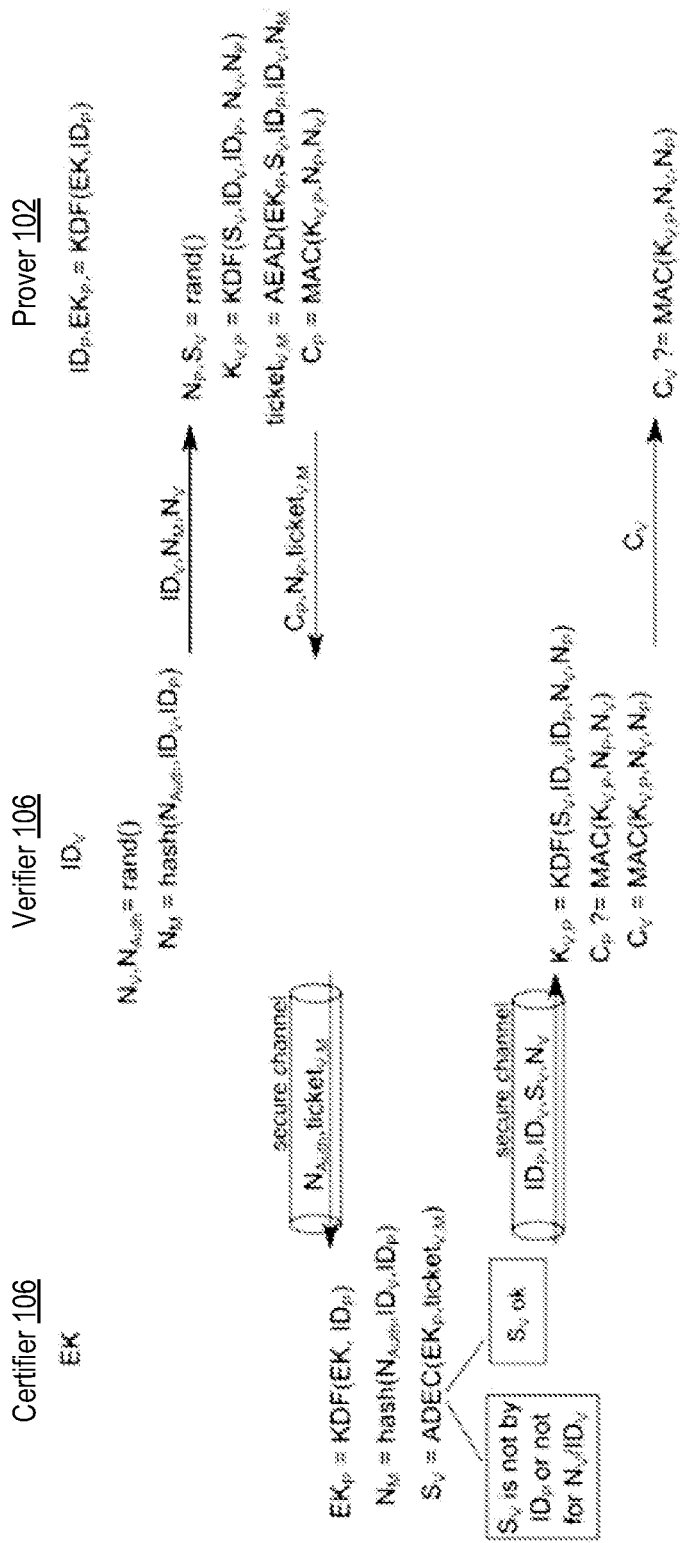
FIG. 3 illustrates an example of symmetric key distribution in accordance with at least one embodiment of the present disclosure.

FIG. 3 illustrates an example of symmetric key distribution 108' in accordance with at least one embodiment of the present disclosure. FIG. 3 details how verifier 104 and prover 102 may establish a shared symmetric key $K_{V,P}$ that may be used for remote attestation, an example of which will be described in FIG. 3. Certifier 106 (e.g., the manufacturer of prover 102) may determine an identification $ID_P$ of prover 102 (e.g., at manufacturing time), and may embed an authentication key $EK_P$ into a secure memory location (e.g., encrypted memory) in prover 102. To enhance security, it may be assumed that prover 102 cannot communicate with another device besides verifier 104 during the course of the protocol exchange (e.g., via wired, close-proximity or short-range communication), thus preventing a possible collusion of compromised software at prover 102 with certifier 106 or another external entity. However, verifier 104 and certifier 106 may interact via a secure channel, such as Transport Layer Security (TLS) over Transport Control Protocol/Internet Protocol (TCP/IP). As shown in FIG. 3, verifier 104 may generate random numbers $N_V$ and $N_{AUTH}$ for the key distribution session, and may hash these values with an identifier for verifier 104 $ID_V$ for transmitting the device challenge. Prover 102 may generate data for responding to the challenge, the response including at least key data $C_P$ and ticket$_{V,M}$. $C_P$ and ticket$_{V,M}$ may be generated in prover 102 by performing cryptographic functions on various values including at least the values sent in the device challenge and $ID_P$.

In one embodiment, verifier 104 may then forward $N_{AUTH}$ and ticket$_{V,M}$ to certifier 106 (e.g., via a secure channel). A master-slave key scheme may be employed to reduce the required storage so that certifier 106 may be able to handle a large number of provers 102. Knowing $E_K$, certifier 106 may be able to derive $EK_P$ for one of its devices $ID_P$ using a key derivation function (KDF) such as $EK_P=KDF(E_K, ID_P)$. Authentication of ticket$_{V,M}$ by certifier 106 may result in the generation of authorization token $S_V$ wherein $S_V=ADEC(E_{KP}, ticket_{V,M})$. At least $S_V$ may then be transmitted back to verifier 104 for use in setting symmetric key $K_{V,P}$. As shown in FIG. 3, confirmation CV may then be generated based on $C_V=MAC(K_{V,P}, N_V, N_P)$. Prover 102 may receive confirmation $C_V$ and may utilize $C_V$ to determine that symmetric key $K_{V,P}$ has been set.

In the example protocol of FIG. 3, verifier 104 may not be explicitly authenticated towards prover 102 or certifier 106, meaning that any verifier 104 may trigger this protocol. However, this exchange assures that certifier 106 learns the identity $ID_V$ associated with the symmetric key $K_{V,P}$ deployed to $ID_P$. As such, at least two alternatives may be available for out-of-band authentication (and authorization) of verifier 104: a distributed method that may exploit local (e.g., physical) authorization between verifier 104 and prover 102, and a centralized method wherein certifier 106 may act as a mediator between verifier 104 and prover 102. Local authorization may leverage that many devices already provide an out-of-band key deployment based on physical proximity or similar relationships. For example, a device pairing protocol may perform a symmetric key exchange in a local trusted environment, and may then ask the user to authenticate the exchange by entering a device PIN on either device. In this manner, a common shared secret "S" can be established with prover 102 that was newly acquired by verifier 104. However, prover 102 needs to be equipped with trusted user I/O facilities to perform the pairing in the trusted environment (e.g., which may not be available in some limited-resource devices). Otherwise, verifier 104 would not know if S is shared with secure or compromised software on prover 102. While S by itself may not be useful for attestation, S can be used in the example of FIG. 3 to establish an authenticated channel between verifier 104 and prover 102, ensuring that prover 102 cannot communicate with other parties except for verifier 104. In this manner, S may be used to authenticate and authorize the deployment of symmetric key $K_{V,P}$ locally between verifier 104 and prover 102. The physical isolation of prover in the base protocol ensures that no collaboration with certifier 106 can occur and a successfully shared symmetric key $K_{V,P}$ is only known to verifier 104 and prover 102. Hence, even if prover 102 was compromised, symmetric key $K_{V,P}$ can be used to attest prover 102 and to detect the compromise. Physical isolation may no longer be necessary after attestation of prover 102.

If a local authorization is not feasible or not deemed sufficiently secure, the centralized solution may be employed where certifier 106 explicitly authorizes a verifier 104 to establish a symmetric key $K_{V,P}$ with prover 102. For this purpose, verifier should authenticate to certifier 106 when establishing the secure channel in the base protocol, such that the identity of verifier 104 may be cryptographically linked to $ID_V$ as used in the local communication between verifier 104 and prover 102. For example, if the secure channel between verifier 104 and certifier 106 uses a standard public key scheme for mutual asymmetric authentication, $ID_V$ may be the fingerprint (e.g., cryptographic hash) of the public key $V_{pub}$ of verifier 104. Certifier 106 may then verify that prover 102 is interacting with the same verifier 104 that is in communication with certifier 106 based on no other entity besides verifier 104 knowing the private key for $V_{pub}$, which may be uniquely identified by $ID_V$=hash($V_{pub}$). Hence, certifier 106 may perform an authorization of verifier 104 based on $ID_V$ and $ID_P$, (e.g., by looking up in a database if verifier 104 has purchased prover 102 or if verifier 104 is part of a certain privileged group that can perform attestation of P).

Figure 4:
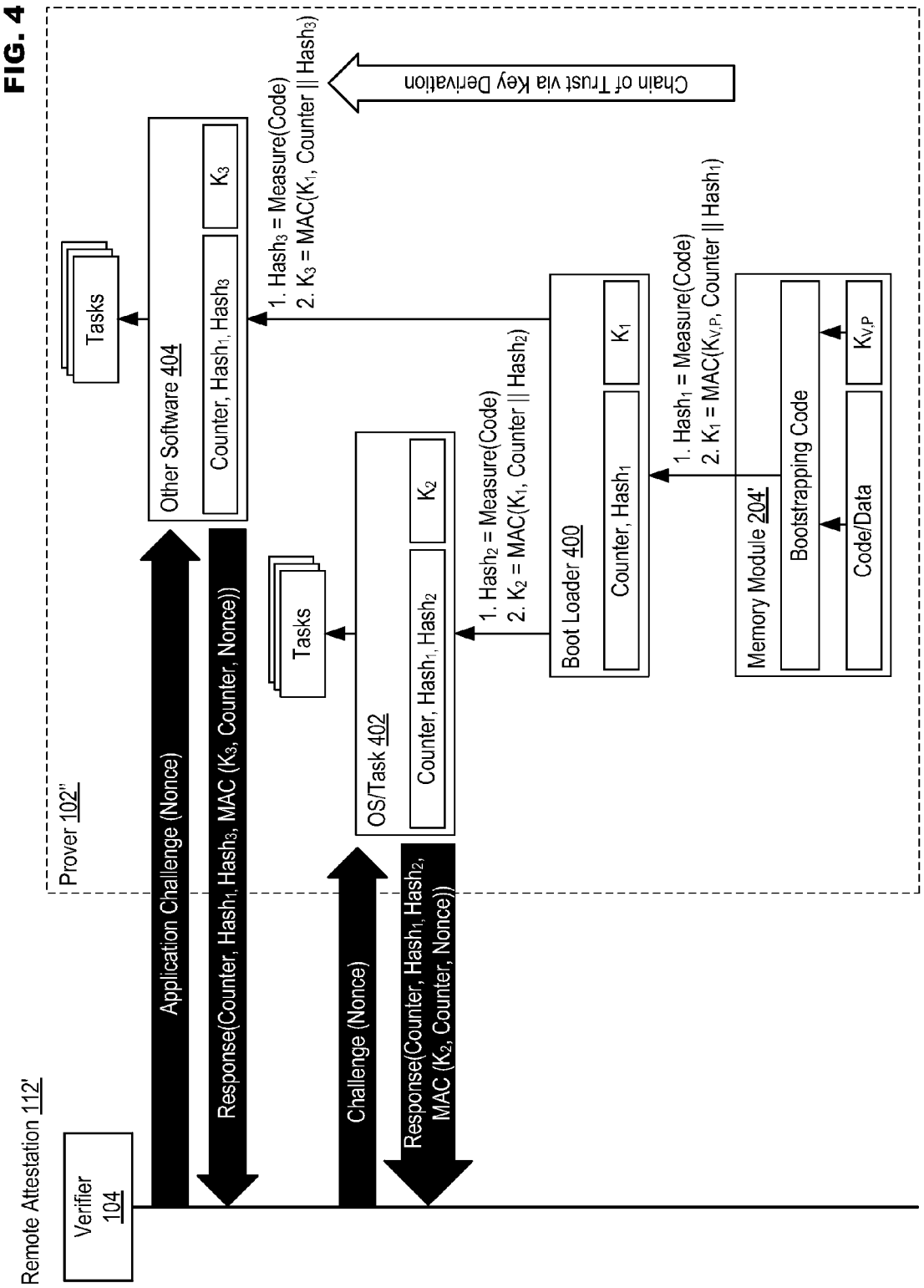
FIG. 4 illustrates an example of remote attestation in accordance with at least one embodiment of the present disclosure.

FIG. 4 illustrates an example of remote attestation 112' in accordance with at least one embodiment of the present disclosure. The remote attestation protocol is a challenge-response protocol where prover 102 may "certify" the software state of its platform using the deployed symmetric key $K_{V,P}$. For this purpose, traditional attestation schemes record the software state of prover 102 in a secure memory location on prover 102, such as the platform configuration registers (PCRs) of a TPM, and then sign those recorded measurements together with a nonce from a challenge by verifier 104. The complete record from an initial bootstrap routine to launching of the OS and applications is called a chain of trust, as each component requires the previously loaded component to measure it.

A similar scheme can be realized by storing software measurements in a memory location that is protected with Execution-aware memory protection scheme by protecting the attestation key $K_{V,P}$ as well as the "software PCRs" such that only the trusted remote attestation code can access that data. However, embedded environments and symmetric attestation keys also enable a further simplification, which may be considered an "implicit" or "derived" chain of trust. In this approach, each time some software is loading another software module the chain of trust may be extended using a corresponding key generation and/or key delegation operation instead of storing the measurements in a safe location. As show in FIG. 4, in prover 102" the chain of trust may be started by the platform bootstrapping code which is in possession of the root symmetric key $K_{V,P}$. However, instead of providing a runtime service based on secure hardware or firmware, which may be resource intensive, a secure boot routine may measure (e.g., typically by hashing) the software module and directly embeds a derived program key $K_M$=MAC($K_{V,P}$, hash$_M$) into a reserved location of the loaded program module. Examples operations are illustrated in FIG. 4 wherein for boot loader 400, Hash$_1$=measurement (boot loader code) and program key $K_1$=MAC($K_{V,P}$, Counter||Hash$_1$). While a counter has been shown in the cryptographic operations of FIG. 4, the use of a counter may be optional. When employed as shown in FIG. 4, the counter may correspond to a variety of quantities. In its simplest form the counter may be a nonce-like value for use in cryptographic operations that never changes in prover 102". The counter may also be a value that is updated each time prover 102" is initialized at power up, when rebooted, etc. For example, boot loader 400 may simply increment a previous value of the counter during initialization. Alternatively, boot loader 400 may totally regenerate the counter (e.g., randomly, based on a set equation or relationship, etc.). In at least one embodiment, the counter value may not change until prover 102" is reinitialized. In an alternative implementation, the counter value may be incremented each time another code module is loaded in prover 102" (e.g., prior to key generation operations). This would result in a different counter value corresponding to each code module. Program key $K_1$ may then be employed to generate a program key corresponding to OS/Task 402 (e.g., Hash$_2$=measurement (OS/Task code) and program key $K_2$=MAC($K_1$, Counter||Hash$_2$). Likewise, a program key corresponding specifically to other software 404 may also be derived, wherein Hash$_3$=measurement (other software code) and program key $K_3$=MAC($K_1$, Counter||Hash$_3$).

Each software module (e.g., OS/Task 402, other software 404, etc.) may then attest to its initial state (e.g., measurement) directly using their corresponding program key $K_M$ (e.g., $K_1$, $K_2$, $K_3$, etc.) together with a chain of measurements (e.g., the various hashes stored in each module). Receiving these measurements as part of the response provided by prover 102 to the application challenge, verifier 104 may then be able to derive program key $K_M$ from $K_{V,P}$ and verify the correct derivation of $K_M$ based only on a MAC computed with program key $K_M$ in view of the nonce provided by verifier 104 in the application challenge. This approach may be especially useful in, for example, low-end devices enabled by execution-aware memory protection that do not require a trusted OS, trusted firmware or privileged CPU modes to provide trusted execution for individual embedded applications (e.g., at minimum hardware and software cost). Symmetric chain of trust may also be used to generate a software-specific encryption key (e.g., used for "sealing" the software).

Figure 5:
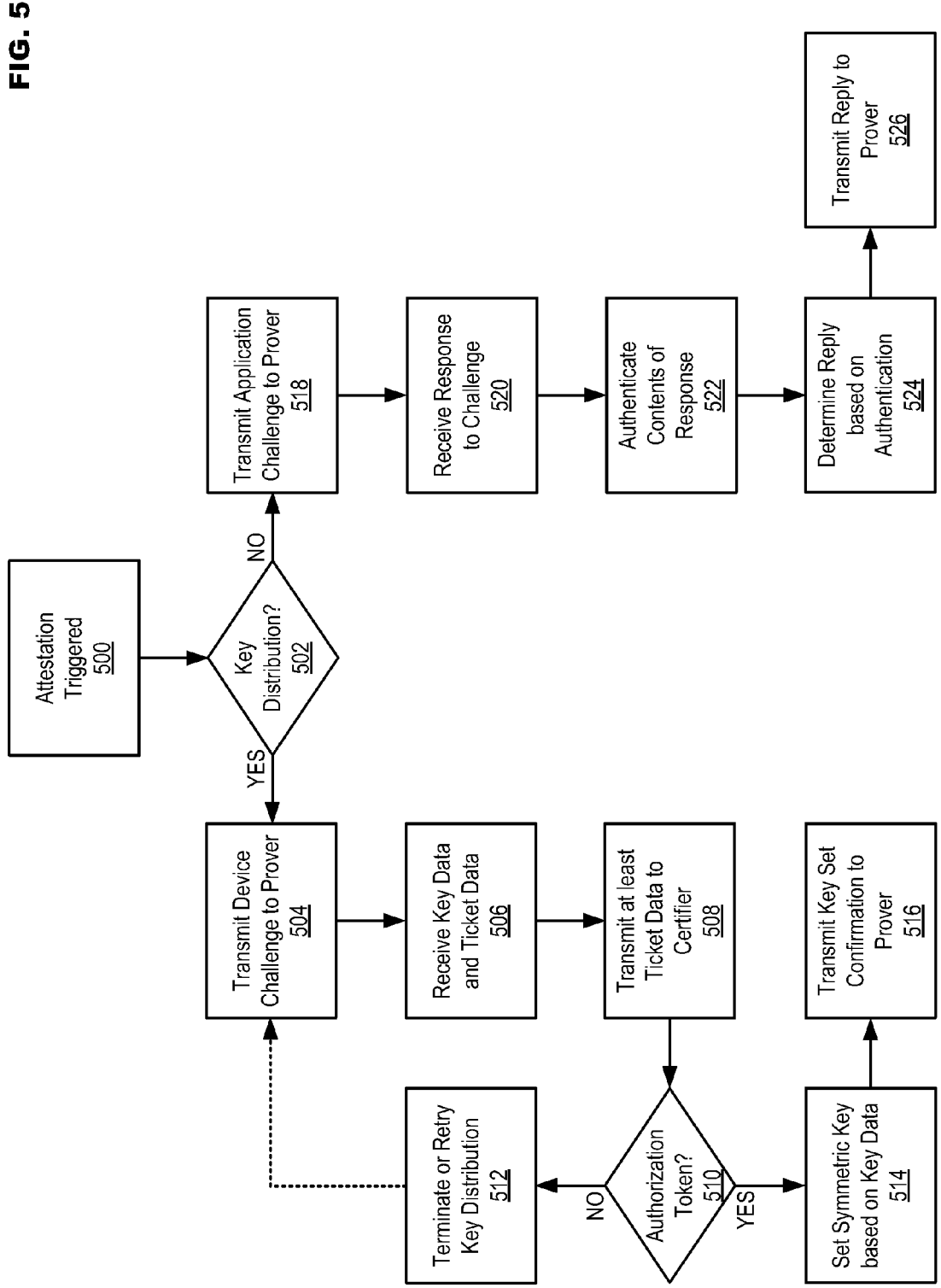
FIG. 5 illustrates example operations for symmetric keying and chain of trust from the perspective of a verifier in accordance with at least one embodiment of the present disclosure.

FIG. 5 illustrates example operations for symmetric keying and chain of trust from the perspective of a verifier in accordance with at least one embodiment of the present disclosure. Initially, attestation may be triggered in verifier. Example attestation triggers may include, for example, the activation of the verifier or a prover, a request to access resources in a verifier received from the prover, data being received from the prover, etc. A determination may then be made in operation 502 as to whether key distribution is required. Key distribution may be required if, for example, the verifier has never interacted with the prover, existing symmetric keys are corrupt or expired, etc. If it is determined in operation 502 that key distribution is required, then in operation 504 a device challenge may be transmitted to the prover. A response to the device challenge may be received in operation 506, the response comprising at least key data and ticket data. The verifier may then proceed to transmit at least the ticket data to a certifier in operation 508. A determination may then be made in operation 510 as to whether a message containing at least an authorization token was received from the certifier in response to the transmission of at least the ticket information in operation 508. If in operation 510 it is determined that a message including the authorization token was not received, then in operation 512 key distribution operations may terminate or optionally return to operation 504 for another attempt. If in operation 510 it is determined that a message comprising at least the authorization token was received, then in operation 514 the authorization token may be used to set a symmetric key (e.g., based at least on the key data received in operation 506). A confirmation that the key was set may then be transmitted to the prover in operation 516.

If in operation 502 it is determined that attestation is required for application and/or data authentication (e.g., that key distribution is not required), then in operation 518 an application challenge may be transmitted to the prover. A response to the application challenge may then be received in operation 520. The verifier may proceed to authenticate the contents of the response in operation 522. Authenticating the contents of the response may comprise at least performing a MAC on a program key provided in the response to determine if the program key was generated based on the symmetric key that was set in operation 514. A reply based on the authentication may be determined in operation 524 and then transmitted to the prover in operation 526.

Figure 6:
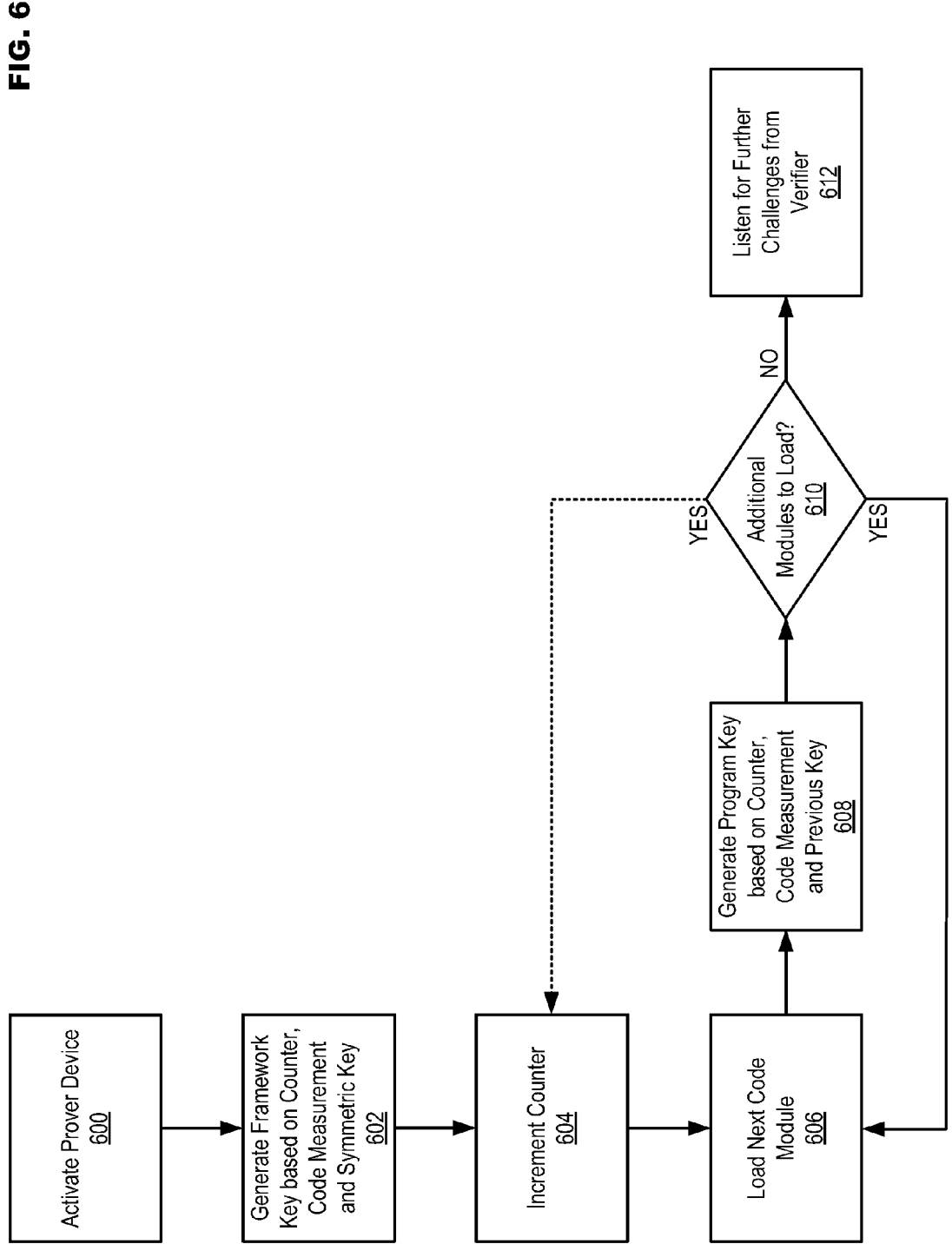
FIG. 6 illustrates example operations for symmetric keying and chain of trust from the perspective of a prover in accordance with at least one embodiment of the present disclosure.

FIG. 6 illustrates example operations for symmetric keying and chain of trust from the perspective of a prover in accordance with at least one embodiment of the present disclosure. The operations disclosed in FIG. 6 presume that key distribution operations (e.g., such as disclosed in FIG. 5, operations 504 to 518) have already occurred so that a symmetric key already resides in the prover. The prover may be activated in operation 600. Following prover activation, bootstrap loading may occur in operation 602 wherein, for example, a framework key (e.g., a boot loader key) may be generated based at least on a counter, a measurement of the boot loader code and the symmetric key.

The counter value may be incremented in operation 604. In one embodiment the counter value may be incremented after the prover is initiated and may remain constant until the prover is later reinitiated. Alternatively, the counter may be incremented as each code module is loaded to generate a different counter value for each code module. A next code module may be loaded in operation 606. For example, an OS/task module may be loaded following the boot code, which may then be followed by other software being loaded, etc. in the prover. Following the loading of the next code module in operation 606, a program key for the code module may be generated based on a current value of the counter, a measurement of the current code module being loaded and the key generated for the previous code module (e.g., framework key or a previous program key) in operation 608. A determination may then be made in operation 610 as to whether there are additional code modules to load in the prover. A determination in operation 610 that there are still additional code modules to load may be followed by a return to operation 606 wherein the next code module may be loaded. In an alternative implementation, operation 610 may be followed by a return to operation 604 wherein the counter may be incremented for the next code module (e.g., as shown by the dotted line). Otherwise, if it is determined in operation 610 that all of the code modules have been loaded, then in operation 612 the prover may start to listen for challenges from the verifier.

Pseudonymous Attestation Utilizing a Chain of Trust

The above embodiments describe how verifier 104 may authenticate prover 102 utilizing a chain of trust derived in prover 102 from $K_{V,P}$, at least some of the data provided by prover 102 being forwarded to certifier 106 for certification. However, there may be instances where prover 102 may not want to reveal its true identity to verifier 104. For example, verifier 104 may be an untrusted device that is unfamiliar to prover 102, such as a new device, a device of another user, a device that is generally available for use by the public, etc. The security of such devices may be unknown, and thus, any identification and/or key data provided to untrusted verifier 104 may be vulnerable. As a result, an owner of prover 102 may want to avoid sharing any data that may be employed for identifying prover 102. Consistent with the present disclosure, pseudonymous attestation utilizing a chain of trust may be employed to protect the identity of prover 102.

In general, pseudonymous attestation utilizing a chain of trust may involve prover 102 providing a response comprising pseudonymous data derived at least in part from the chain-of-trust in prover 102 to verifier 104. Verifier 104 may be able to access pseudonymous data published by certifier 106 to certify that, for example, prover 102 is authentic and includes known-good versions of software (e.g., that are sourced from certifier 106). In this manner, verifier 104 may be assured that prover 102 is authentic without knowing the actual identity of prover 102. In at least one embodiment, prover 102 may also include a trusted execution environment (TEE) 800 to, for example, generate or update the pseudonymous keys based on the symmetric-chain-of trust (e.g., to perform key derivation), to protect at least the pseudonymous keys and possibly platform configuration data (e.g., PCRs), etc.

In at least one embodiment, a device to prove identity or data using pseudonymous remote attestation may comprise, for example, at least a communication module, a memory module and a processing module. The communication module may be to interact with at least a verifier device. The memory module may be to store at least pseudonymous identifier data and a shared symmetric key. The processing module may be to load code modules from the memory module, generate a chain-of-trust based at least on the shared symmetric key, the chain-of-trust including keys corresponding to each of the loaded code modules, generate a pseudonymous public key and a pseudonymous private key based on at least one key in the chain of trust and cause a message to be transmitted to at least the verifier device, the message including at least the pseudonymous identifier data and the public pseudonymous key.

In at least one embodiment, the key corresponding to a code module may be generated based on a performing a cryptographic operation on combined data including a key for a code module loaded just prior to the code module and a hash value of the code module. For example, a code module may correspond to an operating system loaded in the device and the pseudonymous public and private keys may be generated using a cryptographic operation performed on a key in the chain-of-trust corresponding to the operating system. The combined data may also include a counter value stored in the memory module. The message may further comprise at least a nonce received in a challenge message signed by the private pseudonymous key, the counter value and at least one hash value of a code module in the device. The pseudonymous identifier, the shared symmetric key and software updates may be received in the device from at least one certifier device. The device may further comprise a trusted execution environment to store at least the pseudonymous public and private keys. The processing module may be to generate platform configuration data and to store the platform configuration data in the trusted execution environment.

Consistent with the present disclosure, at least one device to certify identity using pseudonymous remote attestation may comprise at least one processing module to, for example, assign at least pseudonymous identifier data and a shared symmetric key to a prover device, generate a pseudonymous public key corresponding to the prover device based at least on the shared symmetric key and provide the pseudonymous identifier data and pseudonymous public key to a verifier device for use in authenticating the prover device. The at least one processing module may be to provide at least the pseudonymous identifier data and the shared symmetric key to the prover device during manufacture or configuration of the prover device. The pseudonymous public key may be generated cryptographically based at least on a known-good version of software provided to the prover device and the shared symmetric key. The processing module at least one may be to, for example, determine whether a software update is available corresponding to the prover device, provide the software update to the prover device based on the determination that the software update is available and generate a new pseudonymous public key corresponding to the prover device based at least on the software update and the shared symmetric key. In providing the pseudonymous identifier data and the pseudonymous public key, the at least one processing module is to publish the pseudonymous identifier and the pseudonymous public key in a database accessible to the verifier device. Consistent with the present disclosure, a method for pseudonymous remote attestation may comprise, for example, loading code modules in a device, generating a chain-of-trust in the device based at least on a shared symmetric key, the chain-of-trust including keys corresponding to each of the loaded code modules, generating an pseudonymous public key and a pseudonymous private key based on at least one key in the chain of trust and causing a message to be transmitted to at least a verifier device, the message including at least pseudonymous identifier data and the public pseudonymous key.

Figure 7:
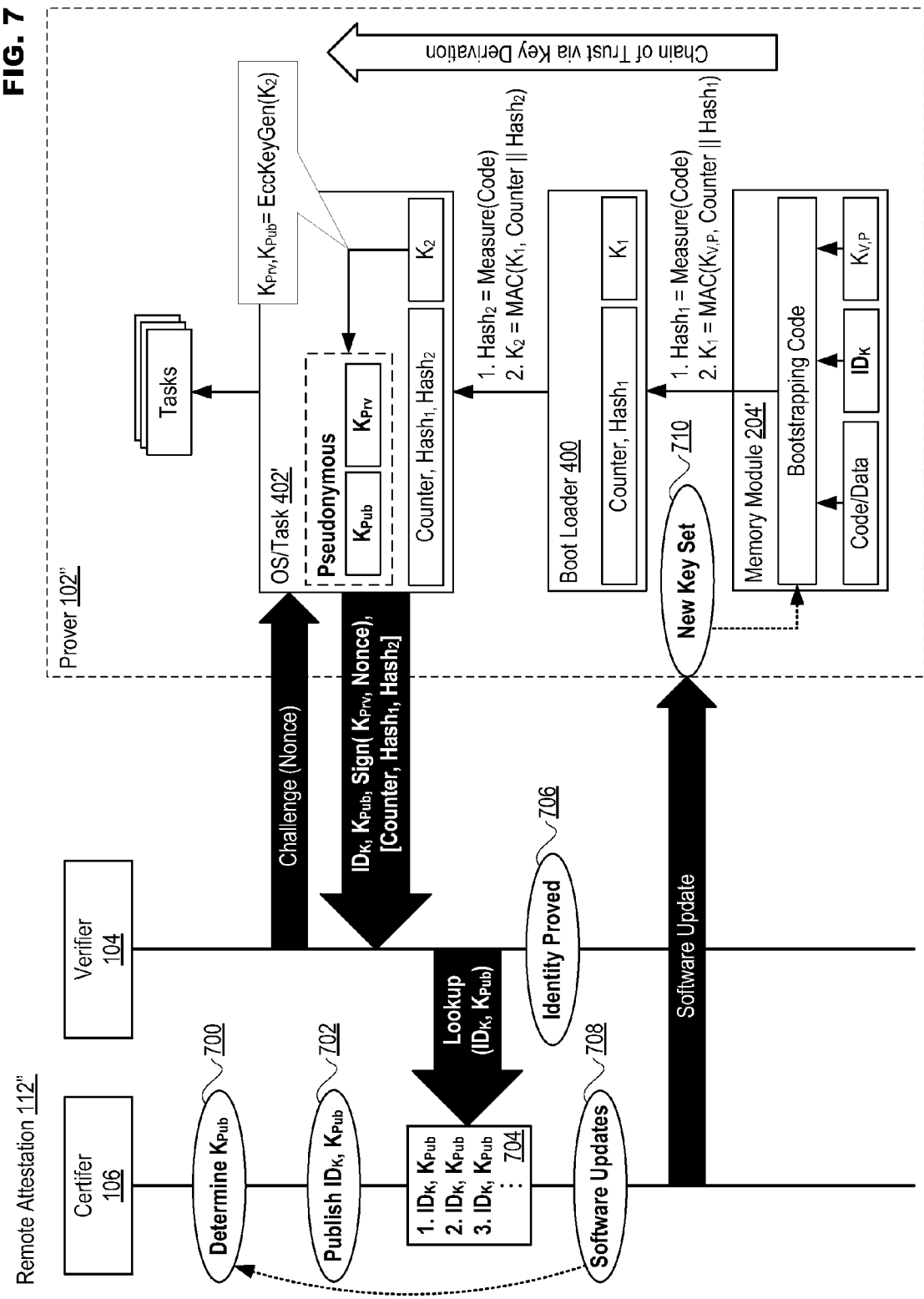
FIG. 7 illustrates an example of pseudonymous remote attestation utilizing a chain-of-trust in accordance with at least one embodiment of the present disclosure.

FIG. 7 illustrates an example of pseudonymous remote attestation utilizing a chain-of-trust in accordance with at least one embodiment of the present disclosure. Initially, the structure of FIG. 7 may be substantially similar to the example disclosed in FIG. 4 with the addition of some features that allow remote attestation to be performed so that the actual identity of prover 102" remains unknown to verifier 104. While the questionable trustworthiness of verifier 104 may be at least one motivation for employing pseudonymous remote attestation utilizing a chain-of-trust consistent with the present disclosure, the example operations described in regard to FIG. 7-10 may be usable with any verifier 104 regardless of familiarity, security features, ownership, etc.

In at least one embodiment, remote attestation may be pseudonymous through the use of a pseudonym $ID_K$ provided to prover 102" by certifier 106. $ID_K$ may be distributed as part of the process by which prover 102" is manufactured, is finally configured prior to being delivered to the user/owner of prover 102", etc. For example, $ID_K$ may be provided to prover 102" at the same time as $K_{V,P}$. Upon activation of prover 102" (e.g., from a power off condition, due to a reboot, etc.), chain-of-trust generation may occur as previously described in regard to FIG. 4. For example, as each code module is loaded in prover 102" (e.g., boot loader 400, OS/Task 402', various tasks operating within OS/Task 402', etc.), a key may be generated (e.g., $K_1$, $K_2$, etc.). Generation of the keys in the chain-of-trust may comprise first generating a hash based on a measurement of a code module. A cryptographic operation (e.g., MAC) may then be used to generate the new key based on combined (e.g., concatenated) data including, for example, the key corresponding to the prior code module (or $K_{V,P}$ if generating the key for boot loader 400), the value of a counter corresponding to the code module for which the key is being generated and the hash of the code module. These operations may be repeated as each code module is loaded until all code modules are loaded in prover 102" and the chain-of-trust is complete.

Asymmetric pseudonymous private key $K_{Prv}$ and asymmetric pseudonymous public key $K_{Pub}$ may then be generated in OS/Task 402' using an Elliptical Curve Cryptography (ECC) operation $K_{Prv}, K_{Pub}$=EccKeyGen(K2) as illustrated in FIG. 7. While an ECC operation is shown in FIG. 7, ECC is merely an example of a cryptographic scheme that may be used for generating the pseudonymous keys. For example, the National Institute of Standards and Technology (NIST) has specified details for a cryptographic key generation scheme in the specification NIST SP-800-56Ar2 (http://nvlpubs.nist.gov/nistpubs/SpecialPublications/NIST.SP.800-56Ar2.pdf). While ECC has been provided as an example, pseudonymous key generation may be adapted to fit the asymmetric attestation algorithm launched to generate the symmetric chain-of-trust. For example, another type of cryptographic scheme may utilize hash-based signatures for generating the public and private keys. An example of key generation utilizing a hash-based signature cryptographic scheme is disclosed here: http://www.cs.b-u.edu/~reyzin/one-time-sigs.html.

Certifier 106 may perform certain activities in support of pseudonymous remote attestation utilizing a chain-of-trust. For example, for each prover 102" certifier 106 may be aware of at least $ID_K$, $K_{V,P}$, $hash_1$ and $hash_2$. $Hash_1$ and $hash_2$ may be based on the last known-good version of software that was distributed from certifier 106 to prover 102" (e.g., code modules including the bootstrapping code in memory module 204', boot loader 400, OS/Task 402', etc.). If a counter is present in prover 102", certifier 106 may determine the counter value based on a variety of synchronization schemes. As described above, the counter may be a nonce-like value that does not change in prover 102". In such an instance the counter may be assigned to each prover 102" by certifier 106, and thus may be known to certifier 106. It may also be possible for certifier 106 to reset the counter in prover 102" when a significant event is reported (e.g., that prover 102" has been reformatted, compromised from a security standpoint, etc.). The counter may also be incremented each time prover 102" is reinitialized. Certifier 106 may be able to track when prover 102" is reinitialized or at least estimate the counter value based on, for example, the age of prover 102", the number of queries received regarding prover 102", etc. In such an instance, certifier 106 may be able to publish a range of $K_{Pub}$ values for each $ID_K$ based on the estimated value of the counter. In an alternative embodiment, verifier 104 may report the counter to certifier 104, which may be configured to calculate $K_{Pub}$ on demand. The counter may also be determined using an equation or relationship based on, for example, user data, time, date, location, device characteristics such as model number, etc. Certifier 106 may likewise employ the equation or relationship to formulate the counter value based its knowledge of prover 102".

Based on the above knowledge, certifier 106 may be able to determine at least $K_{Pub}$ as shown at 700 and to publish $ID_K$ and $K_{Pub}$ pairs as illustrated at 702, or an $ID_K$ and a range of $K_{Pub}$ values based on a counter estimation as discussed above. For example, the $ID_K$ and $K_{Pub}$ pairs may be published in database 704 (e.g., accessible to verifier 104 via wired or wireless communication). In at least one embodiment, certifier 104 may be the manufacturer of prover 102" or at least an entity entrusted with issuing valid software updates to prover 102" such as, for example, a software (e.g., OS) manufacturer, a system integrator, an authorized reseller or servicing entity, etc. When a software update is issued for prover 102" as shown at 708, certifier 106 may push the software update out to all of the applicable provers 102" while reformulating and republishing the $ID_K$ and $K_{Pub}$ pairs for each prover 102" that received the software update. Receiving the software update at 710 may cause prover 102" to generate a new key set by first reformulating the chain-of-trust since the keys making up the chain-of-trust are based, at least in part, on code module measurements, at least some of which may have been changed by the software update. After the chain-of-trust is updated then $K_{Pub}$ and $K_{Prv}$ may be reformulated.

In an example of operation, a challenge including a nonce may be received from verifier 104 at prover 102" may be answered by a response comprising, for example, $ID_K$, $K_{Pub}$, the nonce received in the challenge and signed by $K_{Prv}$, Counter, Hash$_1$ and Hash$_2$. Verifier 104 may then access database 704 to determine whether the $ID_K$, $K_{Pub}$ pair is recognized as associated with a known prover 102" in a recognized valid condition. If the $ID_K$, $K_{Pub}$ pair is determined to be in database 704, verifier 104 may use $K_{Pub}$ to verify the signature of the nonce in the response, establishing that $K_{Prv}$ in prover 102" is valid. Values Hash1, hash2 and ID_K are implicitly included in the signature because they are part of the derivation of $K_{Prv}$ and $K_{Pub}$. Signature verification may further establish that prover 102" did not just obtain a known good $ID_K$, $K_{Pub}$ pair to impersonate a known-good device, but instead that $K_{Pub}$ was actually generated by prover 102". Prover 102" may then be deemed authentic by verifier 104 as shown at 706 without verifier 104 ever having to learn the actual identity of prover 102". Moreover, all of the data provided by prover 102" (e.g., Hash$_1$ and Hash$_2$) are implicitly proved.

Figure 8:
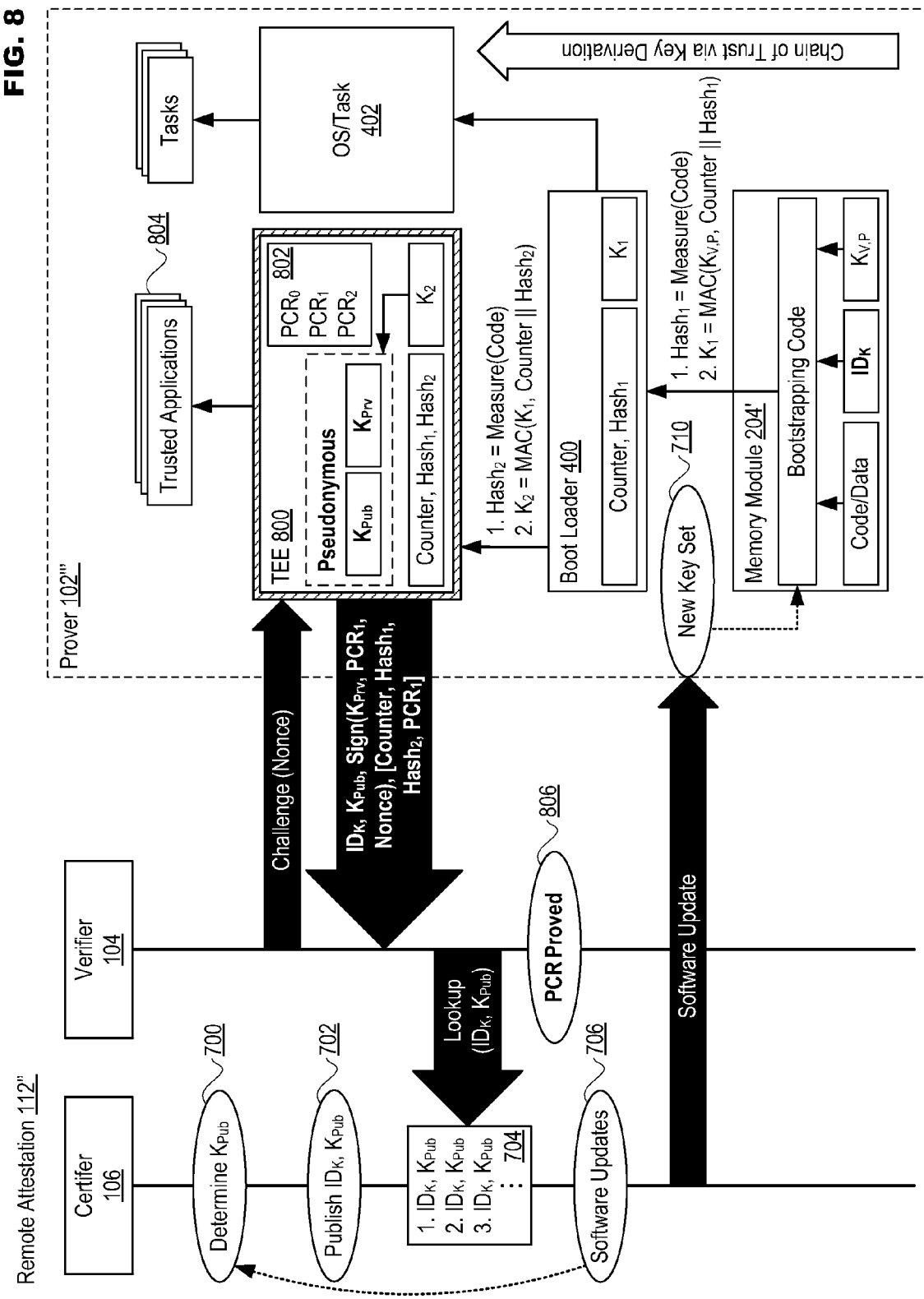
FIG. 8 illustrates an example of pseudonymous remote attestation utilizing a chain-of-trust, the remote attestation being orchestrated through a trusted execution environment in the prover in accordance with at least one embodiment of the present disclosure.

FIG. 8 illustrates an example of pseudonymous remote attestation utilizing a chain-of-trust, the remote attestation being orchestrated through a trusted execution environment in the prover in accordance with at least one embodiment of the present disclosure. The above embodiments describe prover 102 as being a simple device without localized memory protection features such as those provided through SGX. However, FIG. 8 discloses an example implementation wherein prover 102'" includes TEE 800. The functionality of TEE 800 may be provided by a variety of hardware-enforced protection technologies such as, for example, SGX, Trusted Platform Module (TPM), Trustlite, a secure coprocessor, etc. TEE 800 may be employed to sequester data within prover 102'" including at least $K_{Pub}$ and $K_{Prv}$. In addition, TEE 800 may update $K_{Pub}$ and $K_{Prv}$ based on the symmetric chain-of-trust using key derivation operations. In at least one embodiment, this may be performed via TCB recovery operations associated with SGX. Secondly, TEE 800 may generate attestation response messages including PCRs 802. TEE 800 may build on symmetric chain of trust and turn it into a more typical measured launch scheme where PCRs 802 are recorded and signed in a secure environment.

Consistent with the present disclosure, TEE 800 may also store platform configuration data in log 802. In at least one embodiment, platform configuration data may be stored as platform configuration registers (PCR) such as PCR$_0$, PCR$_1$, PCR$_2$, etc. PCRs are typically associated with the TPM standard and may comprise platform security metrics that may be employed to establish that a device (e.g., prover 102'") is in a known-good state, to detect changes in a device from a previously logged configuration, etc. TEE 800 may serve as a secure platform from which known-good (e.g., trusted) applications 804 are launched, while OS/Task 402 may continue to be used to perform various unsecured tasks.

In an example of operation, TEE 800 may handle interaction between prover 102'" and verifier 104. In response to a challenge from verifier 104, prover 102'" may transmit a response including, for example, $ID_K$, $K_{Pub}$, PCR$_1$ and the value of the counter corresponding to OS/Task 402 signed by $K_{Prv}$, Counter, Hash$_1$, Hash$_2$ and PCR$_2$. In a manner similar to that described with respect to FIG. 7, verifier 104 may perform a lookup of $ID_K$, $K_{Pub}$ in database 704 and verify the signature of PCR$_1$ and the counter using $K_{Pub}$. If $ID_K$, $K_{Pub}$ are determined to exist in database 704 and the signature is valid, then prover 102'" may be deemed authentic and in a known-good condition. Based on the general validation of prover 102'" by verifier 104, device configuration data (e.g., PCR1 and PCR2) may be implicitly validated as shown at 806. There may be advantages to using a symmetric chain-of-trust such as illustrated in FIG. 8 instead of key encryption and/or security co-processors for key storage. For example, no runtime secure key storage accessible to TEE 800 is required (e.g., only $K_{P,V}$ for the bootstrapping code). No replay attacks (e.g., where old security data is utilized to replay a previous data transaction to gain access to encrypted data), integrity attacks (e.g., manipulating the data stored in memory) or denial of service (DoS) attacks are possible on encrypted pseudonymous keys $K_{Pub}$ and $K_{Prv}$ stored in TEE 800. Certifier 106 may deploy software updates to address security issues in TEE 800, which will implicitly cause the generation of new pseudonymous keys $K_{Pub}$ and $K_{Prv}$. TEE 800 may provide full flexibility in design and deployment as different services receive different keys, etc.

Figure 9:
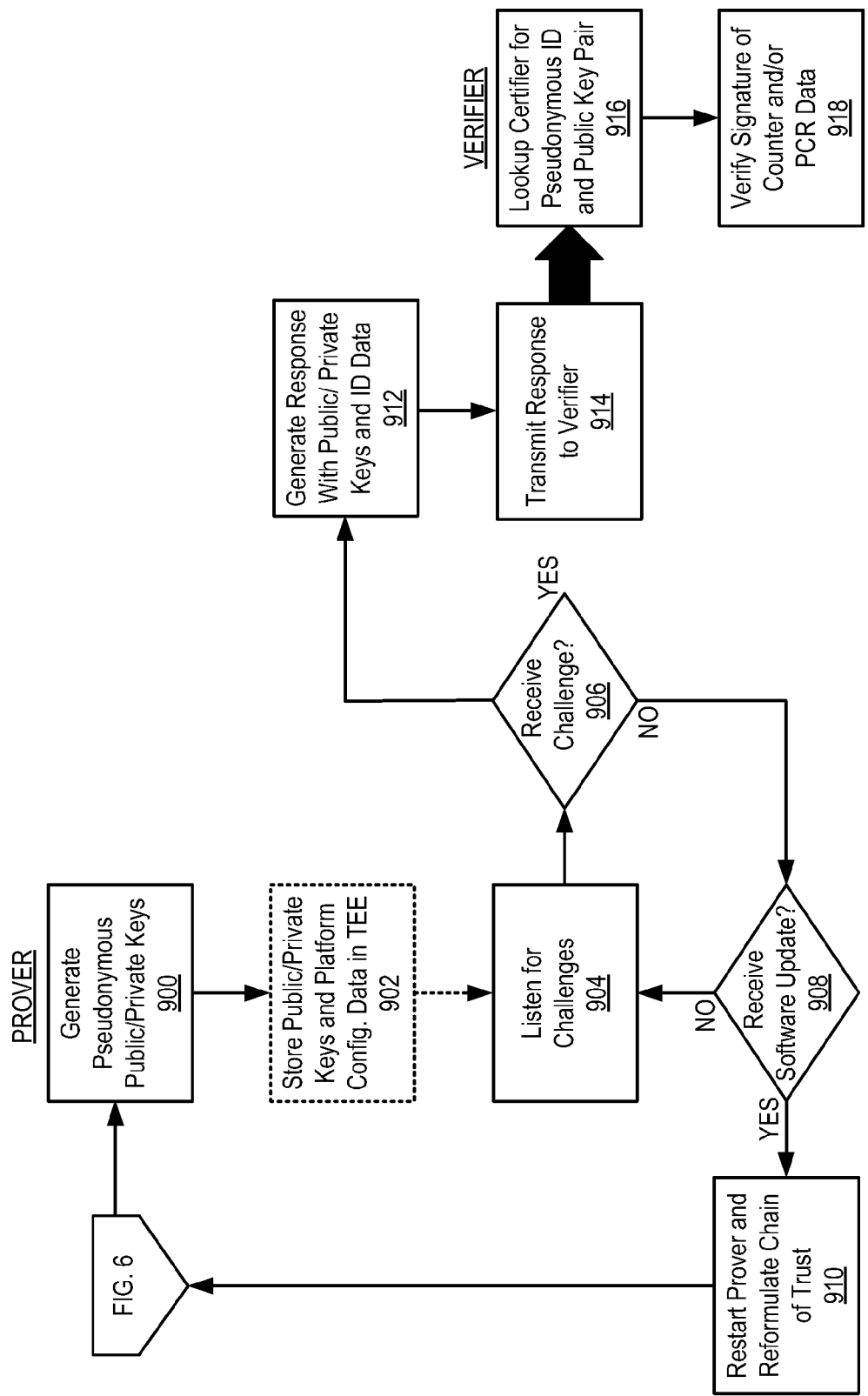
FIG. 9 illustrates example operations for pseudonymous attestation from the perspective of a prover and a verifier in accordance with at least one embodiment of the present disclosure.

FIG. 9 illustrates example operations for pseudonymous attestation from the perspective of a prover and a verifier in accordance with at least one embodiment of the present disclosure. The operations disclosed in FIG. 9 may carry over from the operations of FIG. 6 that describe how to establish a chain-of-trust in the prover (e.g., operations 600 to 610). Operations 900 to 912 may be from the perspective of a prover. Following establishment of the chain-of-trust, in operation 900 a pseudonymous public and private keys may be generated. Operation 902 may be optional in that it may only apply to a situation where the prover includes a TEE such as in the example of FIG. 8. In operation 902 the pseudonymous public key, private key and platform configuration data may be stored in the TEE.

The prover may listen for challenges from a verifier in operation 904. A determination may then be made in operation 906 as to whether a challenge has been received. If in operation 906 it is determined that a challenge has not been received, then in operation 908 a determination may be made as to whether a software update has been received by the prover (e.g., from the certifier). If in operation 908 it is determined that a software update has not been received, then the prover may continue to listen for challenges in operation 904. A determination in operation 908 that a software update has been received may be followed by operation 910 wherein the prover restarts (e.g., reboots) and a new chain-of-trust is generated. The generation of a new chain of trust is indicated by a return to operations 600 to 610 in FIG. 6 to reformulate the chain-of-trust, which may be followed by operation 900 to 906 to reformulate the pseudonymous keys and resume listening for challenges.

If in operation 906 it is determined that a challenge has been received, then in operation 912 a challenge response may be generated including at least pseudonymous identification data for the verifier and the pseudonymous public key. The response may then be transmitted to the verifier in operation 914. Operations 916 and 918 may be performed by the verifier. In operation 914 the verifier may lookup (e.g., query) the certifier for the pseudonymous identification data and pseudonymous key. For example, the verifier may query a database published by the certifier. If the pseudonymous identification data and pseudonymous key pair are located in the database, then in operation 918 the verifier may verify the signature of the counter and/or platform configuration data (e.g., PCR) utilizing the published pseudonymous key. If the checks performed in operations 916 and 918 are successful, then the authenticity and integrity of the prover may be confirmed.

Figure 10:
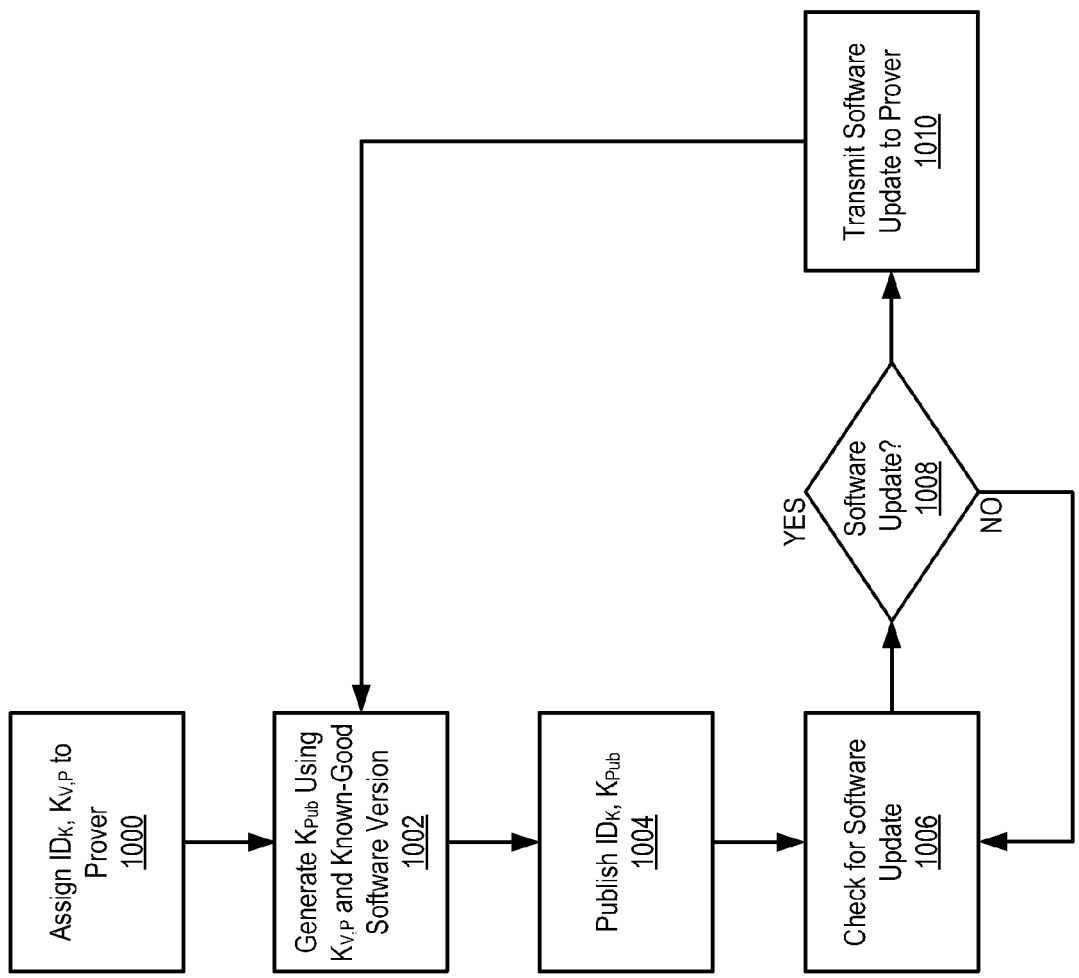
FIG. 10 illustrates example operations for pseudonymous attestation from the perspective of a certifier in accordance with at least one embodiment of the present disclosure.

FIG. 10 illustrates example operations for pseudonymous attestation from the perspective of a certifier in accordance with at least one embodiment of the present disclosure. In operation 1000 pseudonymous identification data (e.g., $ID_K$) and a shared symmetric key (e.g., $K_{V,P}$) may be assigned to the prover device. For example, this may occur during manufacture, configuration (e.g., programming), etc. of the prover. The certifier may then generate at least a public pseudonymous key (e.g., $K_{Pub}$) based on the symmetric key and the last known-good version of software version deployed to the prover in operation 1002. The pseudonymous identification data and pseudonymous key may be published in operation 1004. Publishing may include, for example, placing pseudonymous identification data and key pairs in a database that is accessible by a verifier.

Certifier may then check for software updates to be pushed out to the prover in operations 1006 and 1008. If in operation 1008 it is determined that a software update is ready to go out to the prover, then in operation 1010 the certifier may transmit the software update to the prover. Operation 1010 may be followed by a return to operation 1002 to reformulate the pseudonymous key and republish the pseudonymous identification data and the pseudonymous key. The certifier may then resume monitoring for software updates to be transmitted to the prover in operations 1006 and 1008.

While FIGS. 5, 6, 9 and 10 illustrate operations according to different embodiments, it is to be understood that not all of the operations depicted in FIGS. 5, 6, 9 and 10 are necessary for other embodiments. Indeed, it is fully contemplated herein that in other embodiments of the present disclosure, the operations depicted in FIGS. 5, 6, 9 and 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to pseudonymous attestation utilizing a chain of trust. An example prover device may include a chain-of-trust based on keys derived cryptographically from a shared symmetric key and pseudonymous identification data. The chain-of-trust may be used to cryptographically generate a pseudonymous public key and private key. The prover device may provide at least pseudonymous identification data and the pseudonymous public key to a verifier device. The verifier device may access pseudonymous data published by a certifier determine whether the prover device is authentic and includes known-good versions of software (e.g., sourced from the certifier). In this manner, the verifier device may be assured that the prover device is authentic without knowing the actual identity of the prover device. In at least one embodiment, the prover device may also include a trusted execution environment (TEE).

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for pseudonymous attestation utilizing a chain of trust, as provided below.

According to example 1 there is provided a device to prove identity or data using pseudonymous remote attestation. The device may comprise a communication module to interact with at least a verifier device, a memory module to store at least pseudonymous identifier data and a shared symmetric key and a processing module to load code modules from the memory module, generate a chain-of-trust based at least on the shared symmetric key, the chain-of-trust including keys corresponding to each of the loaded code modules, generate a pseudonymous public key and a pseudonymous private key based on at least one key in the chain of trust and cause a message to be transmitted to at least the verifier device, the message including at least the pseudonymous identifier data and the public pseudonymous key.

Example 2 may include the elements of example 1, wherein a key corresponding to a code module is generated based on a cryptographic operation performed on combined data including a key for a code module loaded just prior to the code module and a hash value of the code module.

Example 3 may include the elements of example 2, wherein the key corresponding to the code module is generated based on performing a MAC operation on the combined data.

Example 4 may include the elements of any of examples 2 to 3, wherein a code module corresponds to an operating system loaded in the device and the pseudonymous public and private keys are generated using a cryptographic operation performed on a key in the chain-of-trust corresponding to the operating system.

Example 5 may include the elements of example 4, wherein the pseudonymous public and private keys are generated by performing an ECCKeyGen operation on the key in the chain-of-trust corresponding to the operating system.

Example 6 may include the elements of any of examples 2 to 5, wherein the combined data also includes a counter value stored in the memory module.

Example 7 may include the elements of example 6, wherein the message further comprises at least a nonce received in a challenge message signed by the private pseudonymous key, the counter value, and at least one hash value of a code module in the device.

Example 8 may include the elements of any of examples 1 to 7, wherein the pseudonymous identifier, the shared symmetric key and software updates are received in the device from at least one certifier device.

Example 9 may include the elements of any of examples 1 to 8, further comprising a trusted execution environment to store at least the pseudonymous public and private keys.

Example 10 may include the elements of example 9, wherein the processing module is to generate platform configuration data and to store the platform configuration data in the trusted execution environment.

Example 11 may include the elements of example 10, wherein at least part of the platform configuration data is included in the message.

According to example 12 there is provided at least one device to certify identity using pseudonymous remote attestation. The at least one device may comprise at least one processing module to assign at least pseudonymous identifier data and a shared symmetric key to a prover device, generate a pseudonymous public key corresponding to the prover device based at least on the shared symmetric key and provide the pseudonymous identifier data and pseudonymous public key to a verifier device for use in authenticating the prover device.

Example 13 may include the elements of example 12, wherein the at least one processing module is to provide at least the pseudonymous identifier data and the shared symmetric key to the prover device during manufacture or configuration of the prover device.

Example 14 may include the elements of any of examples 12 to 13, wherein the pseudonymous public key is generated cryptographically based at least on a known-good version of software provided to the prover device and the shared symmetric key.

Example 15 may include the elements of example 14, wherein the pseudonymous public key is generated cryptographically based also on a counter value corresponding to the prover device.

Example 16 may include the elements of example 15, wherein the processing module is to approximate the counter value and generate a range pseudonymous public keys corresponding to the approximated counter value.

Example 17 may include the elements of any of examples 12 to 16, wherein the at least one processing module is to determine whether a software update is available corresponding to the prover device, provide the software update to the prover device based on the determination that the software update is available and generate a new pseudonymous public key corresponding to the prover device based at least on the software update and the shared symmetric key.

Example 18 may include the elements of any of examples 12 to 17, wherein in providing the pseudonymous identifier data and the pseudonymous public key the at least one processing module is to publish the pseudonymous identifier and the pseudonymous public key in a database accessible to the verifier device.

According to example 19 there is provided a method for pseudonymous remote attestation. The method may comprise initializing a device, loading code modules in the device, generating a chain-of-trust in the device based at least on a shared symmetric key, the chain-of-trust including keys corresponding to each of the loaded code modules, generating a pseudonymous public key and an pseudonymous private key based on at least one key in the chain of trust and causing a message to be transmitted to at least a verifier device, the message including at least pseudonymous identifier data and the public pseudonymous key.

Example 20 may include the elements of example 19, wherein generating a chain of trust comprises performing a cryptographic operation on combined data including a key for a code module loaded just prior to the code module and a hash value of the code module.

Example 21 may include the elements of example 20, wherein the chain of trust is generated based on performing a MAC operation on the combined data.

Example 22 may include the elements of any of examples 20 to 21, wherein the combined data comprises a counter value.

Example 23 may include the elements of example 22, wherein generating a chain of trust comprises performing a cryptographic operation on combined data including a key for a code module loaded just prior to the code module, a counter value and a hash value of the code module.

Example 24 may include the elements of any of examples 22 to 23, wherein generating the pseudonymous public and private keys comprises performing a cryptographic operation on a key in the chain-of-trust corresponding to an operating system in the device.

Example 25 may include the elements of example 24, wherein the pseudonymous public and private keys are generated by performing an ECCKeyGen operation on the key in the chain-of-trust corresponding to the operating system.

Example 26 may include the elements of any of examples 22 to 25, wherein the message further comprises at least a nonce received in a challenge message signed by the private pseudonymous key, the counter value and at least one hash value of a code module in the device.

Example 27 may include the elements of any of examples 19 to 26, and may further comprise receiving a software update in the device and regenerating at least the chain-of-trust and the pseudonymous public and private keys based on the software update.

Example 28 may include the elements of any of examples 19 to 27, and may further comprise storing at least the pseudonymous public and private keys in a trusted execution environment in the device, generating platform configuration data and storing at least the platform configuration data in the trusted execution environment.

According to example 29 there is provided a method to certify identity using pseudonymous remote attestation. The method may comprise assigning at least pseudonymous identifier data and a shared symmetric key to a prover device, generating a pseudonymous public key corresponding to the prover device based at least on the shared symmetric key and providing the pseudonymous identifier data and pseudonymous public key to a verifier device for use in authenticating the prover device.

Example 30 may include the elements of example 29, and may further comprise providing at least the pseudonymous identifier data and the shared symmetric key to the prover device during manufacture or configuration of the prover device.

Example 31 may include the elements of any of examples 29 to 30, wherein the pseudonymous public key is generated cryptographically based at least on a known-good version of software provided to the prover device and the shared symmetric key.

Example 32 may include the elements of example 31, wherein the pseudonymous public key is generated cryptographically based also on a counter value corresponding to the prover device.

Example 33 may include the elements of example 32, and may further comprise approximating the counter value and generating a range pseudonymous public keys corresponding to the approximated counter value.

Example 34 may include the elements of any of examples 29 to 33, and may further comprise determining whether a software update is available corresponding to the prover device, providing the software update to the prover device based on the determination that the software update is available and generating a new pseudonymous public key corresponding to the prover device based at least on the software update and the shared symmetric key.

Example 35 may include the elements of any of examples 29 to 34, wherein providing the pseudonymous identifier data and the pseudonymous public key comprises publishing the pseudonymous identifier and the pseudonymous public key in a database accessible to the verifier device.

According to example 36 there is provided a system including at least a device, the system being arranged to perform the method of any of the above examples 19 to 35.

According to example 37 there is provided a chipset arranged to perform the method of any of the above examples 19 to 35.

According to example 38 there is provided at least one machine readable medium comprising a plurality of instructions that, in response to be being executed on a computing device, cause the computing device to carry out the method according to any of the above examples 19 to 35.

According to example 39 there is provided at least one device configured for pseudonymous remote attestation, the device being arranged to perform the method of any of the above examples 19 to 35.

According to example 40 there is provided a system for pseudonymous remote attestation. The system may comprise means for initializing a device, means for loading code modules in the device, means for generating a chain-of-trust in the device based at least on a shared symmetric key, the chain-of-trust including keys corresponding to each of the loaded code modules, means for generating an pseudonymous public key and a pseudonymous private key based on at least one key in the chain of trust and means for causing a message to be transmitted to at least a verifier device, the message including at least pseudonymous identifier data and the public pseudonymous key.

Example 41 may include the elements of example 40, wherein the means for generating a chain of trust comprise means for performing a cryptographic operation on combined data including a key for a code module loaded just prior to the code module and a hash value of the code module.

Example 42 may include the elements of example 41, wherein the chain of trust is generated based on performing a MAC operation on the combined data.

Example 43 may include the elements of any of examples 41 to 42, wherein the combined data comprises a counter value.

Example 44 may include the elements of any of examples 40 to 43, wherein the means for generating a chain of trust comprise means for performing a cryptographic operation on combined data including a key for a code module loaded just prior to the code module, a counter value and a hash value of the code module.

Example 45 may include the elements of example 44, wherein the means for generating the pseudonymous public and private keys comprise means for performing a cryptographic operation on a key in the chain-of-trust corresponding to an operating system in the device.

Example 46 may include the elements of example 45, wherein the pseudonymous public and private keys are generated by performing an ECCKeyGen operation on the key in the chain-of-trust corresponding to the operating system.

Example 47 may include the elements of any of examples 44 to 46, wherein the message further comprises at least a nonce received in a challenge message signed by the private pseudonymous key, the counter value and at least one hash value of a code module in the device.

Example 48 may include the elements of any of examples 40 to 47, and may further comprise means for receiving a software update in the device and means for regenerating at least the chain-of-trust and the pseudonymous public and private keys based on the software update.

Example 49 may include the elements of any of examples 40 to 48, and may further comprise means for storing at least the pseudonymous public and private keys in a trusted execution environment in the device, means for generating platform configuration data and means for storing at least the platform configuration data in the trusted execution environment.

According to example 50 there is provided a system to certify identity using pseudonymous remote attestation. The system may comprise means for assigning at least pseudonymous identifier data and a shared symmetric key to a prover device, means for generating a pseudonymous public key corresponding to the prover device based at least on the shared symmetric key and means for providing the pseudonymous identifier data and pseudonymous public key to a verifier device for use in authenticating the prover device.

Example 51 may include the elements of example 50, and may further comprise means for providing at least the pseudonymous identifier data and the shared symmetric key to the prover device during manufacture or configuration of the prover device.

Example 52 may include the elements of any of examples 50 to 51, wherein the pseudonymous public key is generated cryptographically based at least on a known-good version of software provided to the prover device and the shared symmetric key.

Example 53 may include the elements of example 52, wherein the pseudonymous public key is generated cryptographically based also on a counter value corresponding to the prover device.

Example 54 may include the elements of example 53, and may further comprise means for approximating the counter value and generating a range pseudonymous public keys corresponding to the approximated counter value.

Example 55 may include the elements of any of examples 50 to 54, and may further comprise means for determining whether a software update is available corresponding to the prover device, means for providing the software update to the prover device based on the determination that the software update is available and means for generating a new pseudonymous public key corresponding to the prover device based at least on the software update and the shared symmetric key.

Example 56 may include the elements of any of examples 50 to 55, wherein the means for providing the pseudonymous identifier data and the pseudonymous public key comprise means for publishing the pseudonymous identifier and the pseudonymous public key in a database accessible to the verifier device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to prove identity or data using pseudonymous remote attestation, comprising:
   a communication module to interact with at least a verifier device;
   a memory module to store at least pseudonymous identifier data and a shared symmetric key; and
   a processing module to:
      load code modules from the memory module;
      generate a chain-of-trust based at least on the shared symmetric key, the chain-of-trust including keys corresponding to each of the loaded code modules;
      generate a pseudonymous public key and a pseudonymous private key based on at least one key in the chain of trust; and
      cause a message to be transmitted to at least the verifier device, the message including at least the pseudonymous identifier data and the public pseudonymous key.

2. The device of claim 1, wherein a key corresponding to a code module is generated based on a cryptographic operation performed on combined data including a key for a code module loaded just prior to the code module and a hash value of the code module.

3. The device of claim 2, wherein a code module corresponds to an operating system loaded in the device and the pseudonymous public and private keys are generated using a cryptographic operation performed on a key in the chain-of-trust corresponding to the operating system.

4. The device of claim 2, wherein the combined data also includes a counter value stored in the memory module.

5. The device of claim 4, wherein the message further comprises at least a nonce received in a challenge message signed by the private pseudonymous key, the counter value, and at least one hash value of a code module in the device.

6. The device of claim 1, wherein the pseudonymous identifier, the shared symmetric key and software updates are received in the device from at least one certifier device.

7. The device of claim 1, further comprising a trusted execution environment to store at least the pseudonymous public and private keys.

8. The device of claim 7, wherein the processing module is to generate platform configuration data and to store the platform configuration data in the trusted execution environment.

9. At least one device to certify identity using pseudonymous remote attestation, comprising:
   at least one processing module to:
      assign at least pseudonymous identifier data and a shared symmetric key to a prover device;
      generate a pseudonymous public key corresponding to the prover device based at least on the shared symmetric key; and
      provide the pseudonymous identifier data and pseudonymous public key to a verifier device for use in authenticating the prover device.

10. The device of claim 9, wherein the at least one processing module is to provide at least the pseudonymous identifier data and the shared symmetric key to the prover device during manufacture or configuration of the prover device.

11. The device of claim 9, wherein the pseudonymous public key is generated cryptographically based at least on a known-good version of software provided to the prover device and the shared symmetric key.

12. The device of claim 9, wherein the at least one processing module is to:
   determine whether a software update is available corresponding to the prover device;
   provide the software update to the prover device based on the determination that the software update is available; and
   generate a new pseudonymous public key corresponding to the prover device based at least on the software update and the shared symmetric key.

13. The device of claim 9, wherein in providing the pseudonymous identifier data and the pseudonymous public key the at least one processing module is to publish the pseudonymous identifier and the pseudonymous public key in a database accessible to the verifier device.

14. A method for pseudonymous remote attestation, comprising:
   initializing a device;
   loading code modules in the device;
   generating a chain-of-trust in the device based at least on a shared symmetric key, the chain-of-trust including keys corresponding to each of the loaded code modules;
   generating a pseudonymous public key and a pseudonymous private key based on at least one key in the chain of trust; and
   causing a message to be transmitted to at least a verifier device, the message including at least pseudonymous identifier data and the public pseudonymous key.

15. The method of claim 14, wherein generating a chain of trust comprises:
   performing a cryptographic operation on combined data including a key for a code module loaded just prior to the code module, a counter value and a hash value of the code module.

16. The method of claim 15, wherein generating the pseudonymous public and private keys comprises:
   performing a cryptographic operation on a key in the chain-of-trust corresponding to an operating system in the device.

17. The method of claim 15, wherein the message further comprises at least a nonce received in a challenge message signed by the private pseudonymous key, the counter value and at least one hash value of a code module in the device.

18. The method of claim 14, further comprising:
   receiving a software update in the device; and
   regenerating at least the chain-of-trust and the pseudonymous public and private keys based on the software update.

19. The method of claim 14, further comprising:
   storing at least the pseudonymous public and private keys in a trusted execution environment in the device;
   generating platform configuration data; and
   storing at least the platform configuration data in the trusted execution environment.

20. At least one non-transitory machine-readable storage medium having stored thereon, individually or in combination, instructions for pseudonymous remote attestation that, when executed by one or more processors, cause the one or more processors to:
   initialize a device;
   load code modules in the device;
   generate a chain-of-trust in the device based at least on a shared symmetric key, the chain-of-trust including keys corresponding to each of the loaded code modules;
   generate a pseudonymous public key and a pseudonymous private key based on at least one key in the chain of trust; and
   cause a message to be transmitted to at least a verifier device, the message including at least pseudonymous identifier data and the public pseudonymous key.

21. The at least one non-transitory computer readable storage medium of claim 20, wherein the instructions to generate a chain of trust comprise instructions to:
   perform a cryptographic operation on combined data including a key for a code module loaded just prior to the code module, a counter value and a hash value of the code module.

22. The at least one non-transitory computer readable storage of claim 21, wherein the instructions to generate the pseudonymous public and private keys comprise instructions to:
   perform a cryptographic operation on a key in the chain-of-trust corresponding to an operating system in the device.

23. The at least one non-transitory computer readable storage medium of claim 21, wherein the message further comprises at least a nonce received in a challenge message signed by the private pseudonymous key, the counter value and at least one hash value of a code module in the device.

24. The at least one non-transitory computer readable storage medium of claim 20, further comprising, instructions that, when executed by one or more processors, cause the one or more processors to:
   receive a software update in the device; and
   regenerate at least the chain-of-trust and the pseudonymous public and private keys based on the software update.

25. The at least one non-transitory computer readable storage medium of claim 20, further comprising, instructions that, when executed by one or more processors, cause the one or more processors to:
   store at least the pseudonymous public and private keys in a trusted execution environment in the device;
   generate platform configuration data; and
   store at least the platform configuration data in the trusted execution environment.

* * * * *